(12) United States Patent
Uchida

(10) Patent No.: US 10,218,226 B2
(45) Date of Patent: Feb. 26, 2019

(54) POWER RECEIVER

(71) Applicant: FUJITSU LIMITED, Kawasaki-shi, Kanagawa (JP)

(72) Inventor: Akiyoshi Uchida, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 131 days.

(21) Appl. No.: 15/333,348

(22) Filed: Oct. 25, 2016

(65) Prior Publication Data
US 2017/0133888 A1    May 11, 2017

(30) Foreign Application Priority Data
Nov. 10, 2015   (JP) ................. 2015-220713

(51) Int. Cl.
*H02J 50/12*   (2016.01)
*H02J 7/02*    (2016.01)
*H02J 50/40*   (2016.01)

(52) U.S. Cl.
CPC .............. *H02J 50/12* (2016.02); *H02J 7/025* (2013.01); *H02J 50/40* (2016.02)

(58) Field of Classification Search
None
See application file for complete search history.

(56) References Cited

U.S. PATENT DOCUMENTS 9,841,524 B2 * 12/2017 Obayashi .............. G01V 3/104
2010/0171367 A1 * 7/2010 Kitamura ............. H02J 7/025
                                                             307/104

FOREIGN PATENT DOCUMENTS

| JP | 2006-074901 | 3/2006 |
| JP | 2010-088143 | 4/2010 |
| JP | 2012-195993 | 10/2012 |

\* cited by examiner

*Primary Examiner* — Thienvu Tran
*Assistant Examiner* — David M Stables
(74) *Attorney, Agent, or Firm* — Fujitsu Patent Center

(57) ABSTRACT

A power receiver includes a secondary-side resonant coil configured to receive electric power from a primary-side resonant coil; a rectifier circuit; a smoothing circuit; a DC-DC converter connected having first and second output terminals; third and fourth output terminals disposed on an output side of the DC-DC converter and connected to a secondary battery; a sub-secondary battery having fifth and sixth output terminals; a switch configured to switch connection between the first and second output terminals, the third and fourth output terminals, and the fifth and sixth output terminals; and a controller configured, when the secondary-side resonant coil starts to receive the electric power, to control the switch to respectively connect the first and second output terminals and a load or first and second input terminals of the sub-secondary battery and to respectively connect the third and fourth output terminals and the fifth and sixth output terminals.

5 Claims, 14 Drawing Sheets

TRANSMISSION ELECTRIC POWER 18.75 W

TRANSMISSION ELECTRIC POWER 12.5 W

| RATED VOLTAGE (V) | UPPER LIMIT VALUE (V) | LOWER LIMIT VALUE (V) |
|---|---|---|
| 5 | 6 | 5 |

| POWER RECEIVER ID | ELECTRIC POWER DATA |
|---|---|
| 001 | EXCESS |

POWER RECEIVER

CROSS-REFERENCE TO RELATED APPLICATION

This application is based upon and claims the benefit of priority of the prior Japanese Patent Application No. 2015-220713, filed on Nov. 10, 2015 the entire contents of which are incorporated herein by reference.

FIELD

The embodiments discussed herein relate to a power receiver.

BACKGROUND

A non-contact power receiving circuit is known in the related art that includes a power receiving part coupled to a proximity magnetic field of the non-contact power receiving circuit, a rectifying part that rectifies an output voltage of the power receiving part, a DC-DC converter that transforms the output voltage of the rectifying part to output the transformed voltage to a power receiving load, and a load modulating part that changes an impedance of the entire circuit by performing load modulation in signal transmission to the non-contact power receiving circuit.

The non-contact power receiving circuit further includes an impedance variable part and a first capacity part connected between the rectifying part and the DC-DC converter via the impedance variable part. The impedance variable part becomes a high impedance in the signal transmission and becomes a low impedance in power transmission. The non-contact power receiving circuit further includes a smoothing capacity part that smooths an output voltage from the rectifying part (for example, see Patent Document 1).

In the non-contact power receiving circuit in the related art, the following problem may occur when a secondary battery such as a battery is connected to an output side of the DC-DC converter to charge the secondary battery.

In a case where the secondary battery has a safety device so as not to draw current until a voltage stabilizes when starting to charge the secondary battery, it is impossible to supply the current from the DC-DC converter to the secondary battery in a time period until the voltage becomes stable.

The time period until the voltage becomes stable is about one or several seconds, for example.

When it becomes impossible to supply the current to the secondary battery from the DC-DC converter, the safety device of the DC-DC converter operates to stop the operation of the DC-DC converter.

As a result, in the non-contact power receiving circuit in the related art, it may be impossible to stably charge the secondary battery as described above.

RELATED-ART DOCUMENTS

Patent Documents

[Patent Document 1] Japanese Laid-open Patent Publication No. 2010-088143

SUMMARY

According to an aspect of the embodiments, a power receiver includes a secondary-side resonant coil configured to utilize magnetic field resonance or electric field resonance, generated between a primary-side resonant coil and the secondary-side resonant coil, to receive electric power from the primary-side resonant coil; a rectifier circuit connected to the secondary-side resonant coil and configured to rectify alternating-current power input from the secondary-side resonant coil; a smoothing circuit connected to an output side of the rectifier circuit; a DC-DC converter connected to an output side of the smoothing circuit and having first and second output terminals; third and fourth output terminals disposed on an output side of the DC-DC converter and connected to a secondary battery; a sub-secondary battery having fifth and sixth output terminals configured to output direct-current power; a switch disposed between the first and second output terminals and the third and fourth output terminals and configured to switch connection between the first and second output terminals, the third and fourth output terminals, and the fifth and sixth output terminals; and a controller configured, when the secondary-side resonant coil starts to receive the electric power from the primary-side resonant coil, to control the switch so as to respectively connect the first and second output terminals and a load or first and second input terminals of the sub-secondary battery and so as to respectively connect the third and fourth output terminals and the fifth and sixth output terminals.

DESCRIPTION OF EMBODIMENT

Hereinafter, embodiments to which a power receiver of the present invention is applied will be described.

First Embodiment

Before first to third embodiments to which a power receiver and a power transmitting system of the present invention are applied are described, a technical premise of the power transmitting system and the power receiver according to the first to third embodiments is described with reference to FIGS. 1 to 3.

Figure 1:
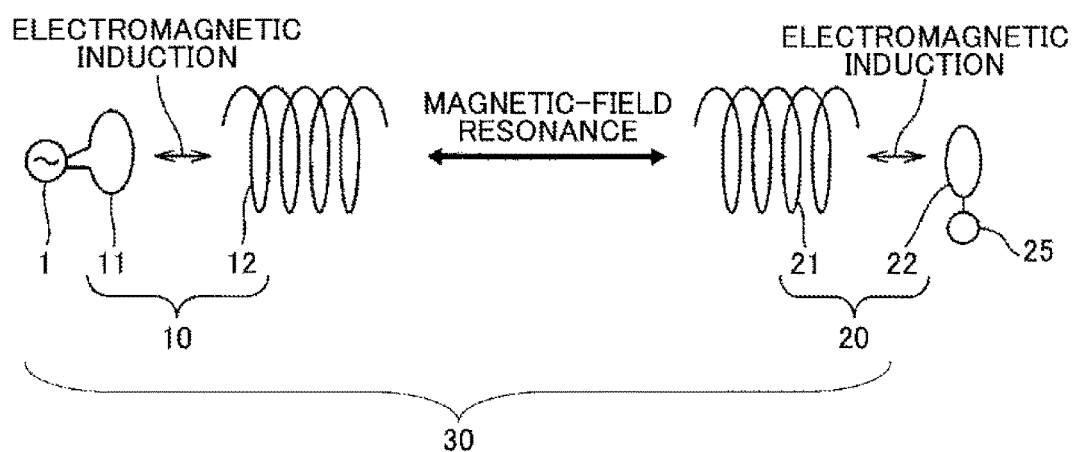
FIG. 1 is a diagram illustrating a power transmitting system 30.

FIG. 1 is a diagram illustrating a power transmitting system 30.

As illustrated in FIG. 1, the power transmitting system 30 includes an alternating-current (AC) power source 1, a primary-side (power transmitting side) power transmitter 10, and a secondary-side (power receiving side) power receiver 20. The power transmitting system 30 may include a plurality of power transmitters 10 and a plurality of power receivers 20.

The power transmitter 10 includes a primary-side coil 11 and a primary-side resonant coil 12. The power receiver 20 includes a secondary-side resonant coil 21 and a secondary-side coil 22. A load device 25 is connected to the secondary-side coil 22.

As illustrated in FIG. 1, the power transmitter 10 and the power receiver 20 perform transmission of energy (electric power) from the power transmitter 10 to the power receiver 20 with magnetic-field resonance (magnetic-field sympathetic vibration) between the primary-side resonant coil (LC resonator) 12 and the secondary-side resonant coil (LC resonator) 21. The electric power can be transmitted from the primary-side resonant coil 12 to the secondary-side resonant coil 21 by not only the magnetic-field resonance but also electric field resonance (electric field sympathetic vibration) or the like. In the following description, the magnetic-field resonance will be mainly described as an example.

In the first embodiment, as an example, a case is described where a resonance frequency of an AC voltage that the AC power source 1 outputs is 6.78 MHz and a resonance frequency of the primary-side resonant coil 12 and the secondary-side resonant coil 21 is 6.78 MHz.

Here, the power transmission from the primary-side coil 11 to the primary-side resonant coil 12 is performed by utilizing electromagnetic induction. Also, the power transmission from the secondary-side resonant coil 21 to the secondary-side coil 22 is performed by utilizing the electromagnetic induction.

Although the power transmitting system 30 includes the secondary-side coil 22 in FIG. 1, the power transmitting system 30 does not have to include the secondary-side coil 22. In this case, the load device 25 may be directly connected to the secondary-side resonant coil 21.

Figure 2:
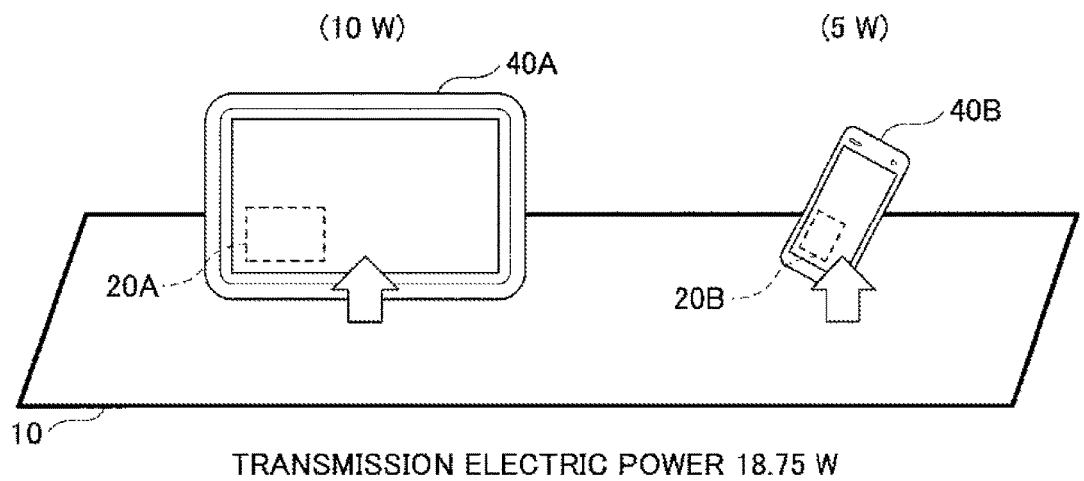
FIG. 2 is a diagram illustrating a state where electric power is transmitted from a power transmitter 10 to electronic devices 40A and 40B by magnetic-field resonance.

FIG. 2 is a diagram illustrating a state where electric power is transmitted from the power transmitter 10 to electronic devices 40A and 40B by the magnetic-field resonance.

The electronic device 40A is a tablet computer that includes a power receiver 20A. The electronic device 40B is a smartphone that includes a power receiver 20B. Each of the power receivers 20A and 20B has a configuration where the secondary-side coil 22 is removed from the power receiver 20 illustrated in FIG. 1. That is, each of the power receivers 20A and 20B includes the secondary-side resonant coil 21. Although the simplified power transmitter 10 is illustrated in FIG. 2, the power transmitter 10 is connected to the AC power source 1 (see FIG. 1).

In FIG. 2, each of the electronic devices 40A and 40B is arranged at an equal distance from the power transmitter 10. The power receivers 20A and 20B included in the respective electronic devices 40A and 40B receive the electric power from the power transmitter 10 by the magnetic-field resonance in a non-contact state.

For example, in a state illustrated in FIG. 2, power reception efficiency of the power receiver 20A included in the electronic device 40A is 40%, and power reception efficiency of the power receiver 20B included in the electronic device 40B is 40%.

The power reception efficiency of the power receivers 20A and 20B is expressed by a ratio of electric power, which the secondary-side coil 22 of each of the power receivers 20A and 20B receives, to electric power transmitted from the primary-side coil 11 connected to the AC power source 1. Here, in a case where the primary-side resonant coil 12 is directly connected to the AC power source 1 and the power transmitter 10 does not include the primary-side coil 11, the received electric power may be calculated by using electric power transmitted from the primary-side resonant coil 12 instead of using the electric power transmitted from the primary-side coil 11. Further, in a case where the power receivers 20A and 20B do not include the secondary-side coil 22, received electric power may be calculated by using electric power received by the secondary-side resonant coil 21 instead of using the electric power received by the secondary-side coil 22.

The power reception efficiency of the power receiver 20A and the power reception efficiency of the power receiver 20B are determined depending on specifications of the coils of the power receivers 20A and 20B and the power transmitter 10 and distances/postures between the power transmitter 10 and the respective power receivers 20A and 20B. In FIG. 2, because the power receivers 20A and 20B have the same configuration and are arranged at the positions, the equal distance/posture away from the power transmitter 10, the power reception efficiency of the power receiver 20A and the power reception efficiency of the power receiver 20B are equal to each other and 40%, for example.

Here, a rated output (rated electric power) of the electronic device 40A is 10 W and a rated output of the electronic device 40B is 5 W.

In such a case, electric power transmitted from the primary-side resonant coil 12 (see FIG. 1) of the power transmitter 10 is 18.75 W. Here, 18.75 W can be calculated by a formula of (10 W+5 W)/(40%+40%).

When electric power of 18.75 W is transmitted to the electronic devices 40A and 40B from the power transmitter 10, the power receivers 20A and 20B receive electric power of 15 W in total. Because the power receivers 20A and 20B equally receive the electric power, each of the power receivers 20A and 20B receives electric power of 7.5 W.

As a result, electric power of about 2.5 W is lacking in the electronic device 40A and electric power of about 2.5 W becomes a surplus in the electronic device 40B.

That is, even when electric power of 18.75 W is transmitted from the power transmitter 10 to the electronic devices 40A and 40B, it is impossible to charge the electronic devices 40A and 40B in a balanced manner. That is, when charging the electronic devices 40A and 40B simultaneously, the balance of supplying the electric power is not good.

Figure 3:
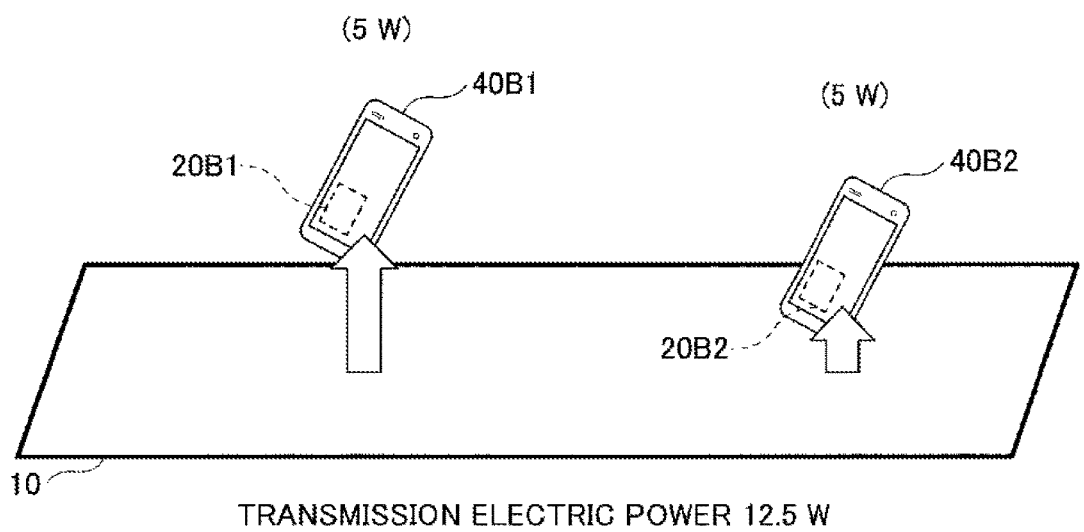
FIG. 3 is a diagram illustrating a state where electric power is transmitted from the power transmitter 10 to electronic devices 40B1 and 40B2 by the magnetic-field resonance.

FIG. 3 is a diagram illustrating a state where electric power is transmitted from the power transmitter 10 to electronic devices 40B1 and 40B2 by the magnetic-field resonance.

The electronic devices 40B1 and 40B2 are same type of smartphones and respectively include power receivers 20B1 and 20B2. Each of the power receivers 20B1 and 20B2 is equal to the power receiver 20B illustrated in FIG. 2. That is, each of the power receivers 20B1 and 20B2 includes the secondary-side resonant coil 21. Although the simplified power transmitter 10 is illustrated in FIG. 3, the power transmitter 10 is connected to the AC power source 1 (see FIG. 1).

In FIG. 3, an angle (posture) of the electronic device 40B1 with respect to the power transmitter 10 is equal to an angle (posture) of the electronic device 40B2 with respect to the power transmitter 10. However, the electronic device 40B1 is arranged further away from the power transmitter than the electronic device 40B2. The power receivers 20B1 and 20B2 included in the respective electronic devices 40B1 and 40B2 receive the electric power from the power transmitter 10 by the magnetic field resonance in a non-contact state.

For example, in a state illustrated in FIG. 3, power reception efficiency of the power receiver 20B1 included in the electronic device 40B1 is 35%, and power reception efficiency of the power receiver 20B2 included in the electronic device 40B2 is 45%.

Here, because the angle (posture) of the electronic device 40B1 with respect to the power transmitter 10 and the angle (posture) of the electronic device 40B2 with respect to the power transmitter 10 are equal to each other, the power reception efficiency of the power receiver 20B1 and the power reception efficiency of the power receiver 20B2 are determined by distances between the power transmitter 10 and the respective power receivers 20B1 and 20B2. Thus, the power reception efficiency of the power receiver 20B1 is lower than the power reception efficiency of the power receiver 20B2 in FIG. 3 because the distance between the power receiver 20B1 and the power transmitter 10 is longer than the distance between the power receiver 20B2 and the power transmitter 10. Here, both the rated voltage of the electronic device 40B1 and the rated voltage of the electronic device 40B2 are 5 W.

In such a case, electric power transmitted from the primary-side resonant coil 12 (see FIG. 1) of the power transmitter 10 is 12.5 W. Here, 12.5 W can be calculated by a formula of (5 W+5 W)/(35%+45%).

When electric power of 12.5 W is transmitted to the electronic devices 40B1 and 40B2 from the power transmitter 10, the power receivers 20B1 and 20B2 receive electric power of 10 W in total. Further, because the power reception efficiency of the power receiver 20B1 is 35%, and the power reception efficiency of the power receiver 20B2 is 45% in FIG. 3, the power receiver 20B1 receives electric power of about 4.4 W and the power receiver 20B2 receives electric power of about 5.6 W.

As a result, electric power of about 0.6 W is missing in the electronic device 40B1 and electric power of about 0.6 W becomes a surplus in the electronic device 40B2.

That is, even when electric power of 12.5 W is transmitted from the power transmitter 10 to the electronic devices 40B1 and 40B2, it is impossible to charge the electronic devices 40B1 and 40B2 in a balanced manner. That is, when charging the electronic devices 40B1 and 40B2 simultaneously, the balance of supplying the electric power is not good. In other words, the balance of supplying the electric power has room for improvement.

The balance of supplying electric power is described above in a case where the angles (postures) of the electronic devices 40B1 and 40B2 with respect to the power transmitter 10 are equal and the distances from the electronic devices 40B1 and 40B2 to the power transmitter 10 are different.

However, because the power reception efficiency is determined depending on the angles (postures) and the distances between the power receivers 20B1 and 20B2 and the power transmitter 10, the power reception efficiency of the power receiver 20B1 and the power reception efficiency of the power receiver 20B2 become different values from the above described 35% and 45% when angles (postures) of the electronic devices 40B1 and 40B2 are different in a positional relationship illustrated in FIG. 3.

Further, the power reception efficiency of the power receiver 20B1 and the power reception efficiency of the power receiver 20B2 become different values from each other when angles (postures) of the electronic devices 40B1 and 40B2 with respect to the power transmitter 10 are different even if the distances from the power transmitter 10 to the electronic devices 40B1 and 40B2 are equal to each other.

Next, a power transmitting system and a power receiver 100 according to a first embodiment will be described with reference to FIGS. 4 and 5.

Figure 4:
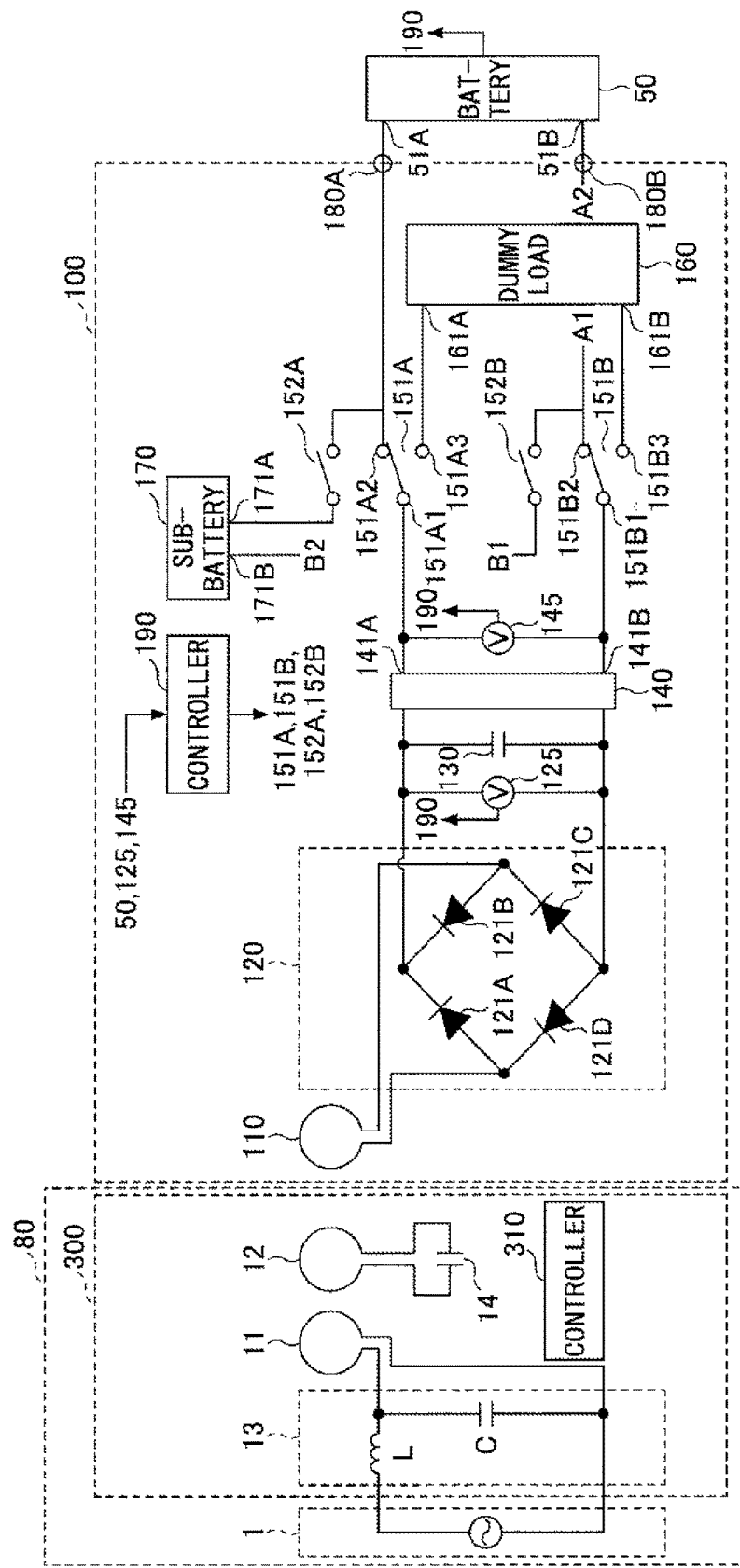
FIG. 4 is a diagram illustrating a power transmitting device 80 and a power receiver 100 according to a first embodiment.

FIG. 4 is a diagram illustrating a power transmitting device 80 and the power receiver 100 according to the first embodiment. The power transmitting apparatus 80 includes an alternating-current (AC) power source 1 and a power transmitter 300. The AC power source 1 illustrated in FIG. 4 is similar to the AC power source 1 illustrated in FIG. 1.

The power transmitting apparatus 80 includes the AC power source 1 and the power transmitter 300.

The power transmitter 300 includes a primary-side coil 11, a primary-side resonant coil 12, a matching circuit 13, a capacitor 14, and a controller 310.

The power receiver 100 includes a secondary-side resonant coil 110, a rectifier circuit 120, a voltmeter 125, a smoothing capacitor 130, a DC-DC converter 140, a voltmeter 145, switches 151A, 151B, 152A, and 152B, a dummy load 160, a sub-battery 170, output terminals 180A and 180B, and a controller 190.

A battery 50 is connected to the output terminals 180A and 180B. In FIG. 4, a load circuit is the battery 50. The output terminals 180A and 180B are an example of third and fourth output terminals.

First, the power transmitter 300 will be described. As illustrated in FIG. 4, the primary-side coil 11 is a loop-shaped coil. The primary-side coil 11 is connected to the AC power source 1 via the matching circuit 13 between two ends of the primary-side coil 11. The primary-side coil 11 is disposed close to but not in contact with the primary-side resonant coil 12. The primary-side coil 11 is electromagnetically coupled to the primary-side resonant coil 12. The primary-side coil 11 is disposed such that the central axis of the primary-side coil 11 matches the central axis of the primary-side resonant coil 12. The central axis of the primary-side coil 11 and the central axis of the primary-side resonant coil 12 are made identical to each other in order to suppress leakage of magnetic flux and to suppress unnecessary generation of magnetic fields around the primary-side coil 11 and the primary-side resonant coil 12 as well as improving the coupling strength between the primary-side coil 11 and the primary-side resonant coil 12.

The primary-side coil 11 generates magnetic fields by alternating-current (AC) power supplied from the AC power source 1 via the matching circuit 13, and transmits the electric power to the primary-side resonant coil 12 by electromagnetic induction (mutual induction).

As illustrated in FIG. 4, the primary-side resonant coil 12 is disposed close to but not in contact with the primary-side coil 11. The primary-side resonant coil 12 is electromagnetically coupled to the primary-side coil 11. Further, the primary-side resonant coil 12 has a predetermined resonance frequency and is designed to have a very high Q value. The resonance frequency of the primary-side resonant coil 12 is set to be equal to the resonance frequency of the secondary-side resonant coil 110. The capacitor 14 for adjusting the resonance frequency is connected in series between the two ends of the primary-side resonant coil 12.

The resonance frequency of the primary-side resonant coil 12 is set to be identical to the frequency of the AC power that the AC power source 1 outputs. The resonance frequency of the primary-side resonant coil 12 is determined depending on a capacitance of the capacitor 14 and an inductance of the primary-side resonant coil 12. Hence, the capacitance of the capacitor 14 and the inductance of the primary-side resonant coil 12 are set such that the resonance frequency of the primary-side resonant coil 12 is identical to the frequency of the AC power output from the AC power source 1.

The matching circuit 13 is inserted for matching impedance of the primary-side coil 11 and that of the AC power source 1, and includes an inductor L and a capacitor C.

The AC power source 1 serves as a power source to output AC power having the frequency necessary for the magnetic field resonance, and includes an amplifier to amplify the output power. The AC power source 1 may, for example, output high frequency AC power from several hundreds kHz to several tens MHz.

The capacitor 14 is a variable capacitance capacitor inserted in series between the two ends of the primary-side resonant coil 12. The capacitor 14 is disposed for adjusting the resonance frequency of the primary-side resonant coil 12. The electrostatic capacitance of the capacitor 14 is set by the controller 310.

The controller 310 controls the output frequency and the output voltage of the AC power source 1, controls the electrostatic capacitance of the capacitor 14, controls an electric energy (output) to be transmitted from the primary-side resonant coil 12, and sets a duty ratio of the power receivers 100A and 100B.

The power transmitting apparatus 80 as described above transmits, to the primary-side resonant coil 12 with magnetic induction, the AC power supplied from the AC power source 1 to the primary-side coil 11, and transmits the electric power from the primary-side resonant coil 12 to the secondary-side resonant coil 110 of the power receiver 100 with magnetic field resonance.

Next, the secondary-side resonant coil 110 included in the power receiver 100 will be described.

The secondary-side resonant coil 110 has a resonance frequency identical to that of the primary-side resonant coil 12, and is designed to have a very high Q value. A pair of terminals of the secondary-side resonant coil 110 is connected to the rectifier circuit 120.

The secondary-side resonant coil 110 outputs, to the rectifier circuit 120, the AC power transmitted from the primary-side resonant coil 12 of the power transmitter 300 by the magnetic field resonance. The rectifier circuit 120 rectifies the AC power input from the secondary-side resonant coil 110.

The rectifier circuit 120 includes four diodes 121A to 121D. The diodes 121A to 121D are connected in a bridge-like configuration, and rectify the full wave of the electric power input from the secondary-side coil 110 to output the full-wave rectified power.

The voltmeter 125 is disposed between the rectifier circuit 120 and the smoothing capacitor 130. The voltmeter 125 is disposed between a pair of lines that connect the rectifier circuit 120 to the output terminals 180A and 180B. The pair of lines has a high potential side line (upper side line in FIG. 4) and a low potential side line (lower side line in FIG. 4). The low potential side line (lower side line in FIG. 4) is a line held at a reference potential (ground potential, for example).

The voltmeter 125 detects a voltage value of the output side of the rectifier circuit 120, and outputs data that represents the voltage value to the controller 190.

The smoothing capacitor 130 is connected to the output side of the rectifier circuit 120. The smoothing capacitor 130 smooths the electric power on which the full-wave rectification is performed by the rectifier circuit 120, and outputs the smoothed power as direct-current power. In other words, the smoothing capacitor 130 may smooth the voltage of the electric power to output the smoothed voltage as direct-current voltage. The smoothing capacitor 130 is an example of a smoothing circuit.

The DC-DC converter 140 is connected to the output side of the smoothing capacitor 130. Because negative components of AC power are inverted into positive components, the electric power on which the full-wave rectification is performed by the rectifier circuit 120 can be treated as substantially AC power. However, stable DC power can be obtained by using the smoothing capacitor 130 even when ripple is included in the full wave rectified power.

The DC-DC converter 140 is connected to the smoothing capacitor 130. The DC-DC converter 140 converts the voltage of the direct-current power smoothed by the smoothing capacitor 130 into the rated voltage of the battery 50 to output the converted voltage. The DC-DC converter 140 lowers the DC voltage, smoothed by the smoothing capacitor 130, to the rated voltage of the battery 50 in a case where the DC voltage smoothed by the smoothing capacitor 130 is higher than the rated voltage of the battery 50.

Further, the DC-DC converter 140 raises the DC voltage, smoothed by the smoothing capacitor 130, to the rated voltage of the battery 50 in a case where the DC voltage smoothed by the smoothing capacitor 130 is lower than the rated voltage of the battery 50.

Here, the DC-DC converter 140 has a mechanism that stops an operation in order to ensure the safety when a state where the current cannot be supplied to the load or the like connected to the output side occurs.

Here, the pair of terminals with which the DC-DC converter 140 outputs the electric power has a high potential side output terminal 141A and a low potential side output terminal 141B. The output terminals 141A and 141B are an example of power output terminals (first and second output terminals).

The voltmeter 145 is disposed between the DC-DC converter 140 and the switches 151A and 151B. The voltmeter 145 is disposed between the pair of lines that connect the rectifier circuit 120 to the output terminals 180A and 180B.

The voltmeter 145 detects an output voltage of the DC-DC converter 140, and outputs data that represents the voltage value to the controller 190.

The switches 151A and 151A are three-terminal switches. The switches 151A and 151B are an example of a first switching unit. For example, Single Pole Double Throw (SPDT) switches may be used as the switches 151A and 151B. Further, p-intrinsic-n Diode (PIN) diodes or mechanical switches may be used. Further, two Field Effect Transistors (FET) may be used to actualize the switches 151A and 151B.

The switch 151A is directly inserted to the high potential side line (upper side line in FIG. 4) of the pair of lines that connect the rectifier circuit 120 to the output terminals 180A and 180B via the smoothing capacitor 130 and the DC-DC converter 140.

The switch 151A includes terminals 151A1, 151A2, and 151A3. The switch 151A serves as a switch that switches a connection destination of the terminal 151A1 to either the terminal 151A2 or the terminal 151A3.

The switch 151A switches the connection destination of the high potential side output terminal 141A of the DC-DC converter 140 to either the output terminal 180A or the high potential side terminal 161A of the dummy load 160. In other words, the switch 151A selectively connects the output terminal 141A to the output terminal 180A or the terminal 161A. Switching control of the switch 151A is performed by the controller 190.

The switch 151B is directly inserted to the low potential side line (lower side line in FIG. 4) of the pair of lines that connect the rectifier circuit 120 to the output terminals 180A and 180B via the smoothing capacitor 130 and the DC-DC converter 140.

The switch 151B includes terminals 151B1, 151B2, and 151B3. The switch 151B serves as a switch that switches a connection destination of the terminal 151B1 to either the terminal 151B2 or the terminal 151B3. In other words, the switches 151A and 151B serve as a first switching unit that respectively switches the connection destinations of the output terminals 141A and 141B to either the terminals 161A and 161B of the dummy load 160 or the output terminals 180A and 180B.

The switch 151B switches the connection destination of the low potential side output terminal 141B of the DC-DC converter 140 to either the output terminal 180B or the low potential side terminal 161B of the dummy load 160. In other words, the switch 151B selectively connects the output terminal 141B to the output terminal 180B or the terminal 161B. Switching control of the switch 151A is performed by the controller 190.

Here, a node A1 located on a right side of the switch 151B and a node A2 located on a left side of the output terminal 180B are connected to each other avoiding the dummy load 160.

The switches 152A and 152B are an example of a second switching unit. Further, a combination of the switches 151A and 151B and the switches 152A and 152B is an example of a switch, which is disposed between the output terminals 141A and 141B and the output terminals 180A and 180B to switch connection (connection status) between the output terminals 141A and 141B, the output terminals 180A and 180B, and the output terminals 171A and 171B. The switches 152A and 152B may be realized by Field Effect Transistors (FET), for example.

The switch 152A branches off from between the terminal 151A2 of the three terminals of the switch 151A and the output terminal 180A. Here, the terminal 151A2 is connected to the output terminal 180A. The switch 152A is connected in series to a line connected to the high potential side output terminal 171A of the sub-battery 170. The switch 152A is switched on (close) and off (open) by the controller 190.

The switch 152B branches off from between the terminal 151B2 of the three terminals of the switch 151B and the output terminal 180B. Here, the terminal 151B2 is connected to the output terminal 180B. The switch 152B is connected in series to a line connected to the low potential side output terminal 171B of the sub-battery 170. The switch 152B is switched on (close) and off (open) by the controller 190. In other words, the switches 152A and 152B serve as a second switching unit that switches the connection status between the output terminals 180A and 180B and the output terminals 171A and 171B.

Here, a node B1 located on the upper side of the switch 152B is connected to a node B2 located on the lower side of the output terminal 171B.

The dummy load 160 serves as a load element having an equal impedance to the battery 50. For example, a resistor may be used as the dummy load 160. The dummy load 160 includes the high potential side terminal 161A and the low potential side terminal 161B. The terminal 161A is connected to the terminal 151A3 of the switch 151A. The terminal 161B is connected to the terminal 151B3 of the switch 151B.

When the power receiver 100 starts to receive the electric power from the power transmitter 300, the dummy load 160 is connected to the output terminals 141A and 141B of the DC-DC converter 140 until the voltage between the terminals 51A and 51B (voltage between terminals) of the battery 50 stabilizes.

This is to maintain a state, where the DC-DC converter 140 operates stably, by causing the dummy load 160 to consume the electric power output from the DC-DC converter 140 when the power receiver 100 starts to receive the electric power from the power transmitter 300.

After the voltage between the terminals of the battery 50 stabilizes, the switches 151A and 151B are switched and the dummy load 160 is disconnected from the DC-DC converter 140.

When the power receiver 100 starts to receive the electric power from the power transmitter 300, the sub-battery 170 serves as an auxiliary battery used for preparing (controlling) the battery 50 in advance such that, in a state where the battery 50 is disconnected from the DC-DC converter 140, charging of the battery 50 is started to make a state where the battery 50 can be charged stably.

The sub-battery 170 may be any secondary battery that can output DC power having stabilized voltage immediately after the output terminals 171A and 171B start to output the electric power from a state of not outputting the electric power. For example, a lithium ion battery or a capacitor may be used as the sub-battery 170. The output terminals 171A and 171B are an example of power output terminals (fifth and sixth output terminals) that output DC power.

Even when the voltage is applied and the current is supplied in order to start the charging, the battery 50 does not draw the current until the voltage between the terminals 51A and 51B (voltage between the terminals) stabilizes. Thus, the battery 50 cannot be charged until the voltage between the terminals 51A and 51B becomes stable. As described above, a certain time is required until the battery 50 becomes a chargeable state from the start of charging the battery 50 (until the voltage between the terminals stabilizes).

For example, the time necessary to stabilize the voltage between the terminals of the battery 50 may be about 1 or several seconds. Such a required time differs depending on a capacity, a type, or the like of the battery 50. Thus, the capacity of the sub-battery 170 may be a capacity that can supply the DC power to the battery 50 over a required time (time period) necessary to stabilize the voltage between the terminals of the battery 50.

The output terminal 180A is connected to the terminal 151A2 of the switch 151A and to the switch 152A. The output terminal 180B is connected to the terminal 151B2 of the switch 151B and to the switch 152B.

In a state where the output terminals 180A and 180B are disconnected from the sub-battery 170 by the switches 152A and 152B (both of the switches 152A and 152B are in off (open) states), the output terminals 180A and 180B are connected to the DC-DC converter 140 by the switches 151A and 151B. In this state, the DC power output from the DC-DC converter 140 can be supplied to the output terminals 180A and 180B.

Further, in a state where the output terminals 180A and 180B are disconnected from the DC-DC converter 140 by the switches 151A and 151B (state where the switches 151A and 151B are connected to the dummy load 160), the output terminals 180A and 180B are connected to the sub-battery 170 by the switches 152A and 152B. In this state, the DC power output from the sub-battery 170 can be supplied to the output terminals 180A and 180B.

The controller 190 performs switching control for the switches 151A, 151B, 152A, and 152B to perform control for preparing an environment where the battery 50 can be stably charged.

When the power receiver 100 starts to receive the electric power from the power transmitter 300, the controller 190 switches the switches 151A and 151B so as to connect the DC-DC converter 140 and the dummy load 160 and turns on (close) the switches 152A and 152B so as to connect the sub-battery 170 and the output terminals 180A and 180B.

Further, when a predetermined time has passed after the power receiver 100 starts to receive the electric power from the power transmitter 300, the controller 190 turns off (open) the switches 152A and 152B so as to disconnect the sub-battery 170 and the output terminals 180A and 180B and switches the switch 151A and 151B so as to connect the DC-DC converter 140 and the output terminals 180A and 180B.

Here, "when the power receiver 100 starts to receive the electric power from the power transmitter 300" means a time period from when the power receiver 100 starts to receive the electric power, from a state in which the power receiver 100 does not receive the electric power from the power transmitter 300, to when a time necessary to stabilize the voltage between the terminals of the battery 50 has passed. In other words, it means a time period from a time point, at which the power receiver 100 starts to receive the electric power, to a time point, at which the voltage between the terminals of the battery 50 has stabilized. For example, the time (time period) necessary to stabilize the voltage between the terminals of the battery 50 may be about 1 or several seconds.

The controller 190 switches the switches 151A, 151B, 152A, and 152B at the time point when the predetermined time period has passed after starting to receive the electric power as described above. The time period from the start of receiving the electric power until the predetermined time period has passed is a time (time period) necessary to stabilize the voltage between the terminals of the battery 50.

Because a time necessary for the stabilization differs depending on a type of the battery 50, the time necessary for the stabilization corresponding to the type of the battery 50 may be set (stored) in an internal memory or the like of the controller 190. For example, the internal memory may store a first time corresponding to a first type of the battery and a second time corresponding to a second type of the battery.

The battery 50 includes terminals 51A and 51B. The terminals 51A and 51B are respectively connected to the output terminals 180A and 180B. The battery 50 may be any rechargeable secondary battery that can be repeatedly charged. For example, a lithium ion battery may be used as the battery 50. For example, in a case where the power receiver 100 is included in an electronic device such as a tablet computer or a smartphone, the battery 50 is a main battery of the electronic device.

As described above, until the voltage between the terminals stabilizes right after the start of the charging, the battery 50 does not draw the current and cannot be charged. This is because the battery 50 has a controller such as a microcomputer to monitor the voltage between the terminals and control is performed so as not to start the charging until the voltage between the terminals stabilizes.

The required time until the voltage between the terminals of the battery 50 becomes stable may be about 1 or several seconds, for example, and differs depending on a type, capacity, or the like of the battery 50.

A charging condition of the battery 50 can be expressed by a charging rate of the battery 50. Here, data representing the charging rate of the battery 50 is used as data representing the charging condition of the battery 50. The data representing the charging rate of the battery 50 is referred to as charging rate data.

The charging rate data is calculated by the controller included in the battery 50 and is input to the controller 190 from the battery 50. The power receiver 100 transmits the charging rate data to the power transmitter 300.

There are various methods for calculating the charging rate of the battery 50. For example, the charging rate can be calculated by the controller included in the battery 50 referring to data, which represents the relationship between the voltage between the terminals and the charging rate, based on the voltage between the terminals 51A and 51B (voltage between the terminals) of the battery 50. In this case, a value of current that flows in the terminal 51A or the terminal 51B may be used. The charging rate of the battery 50 may be calculated by any calculation method. Further, the battery 50 may transmit, to the controller 190, data representing the voltage between the terminals as the charging rate data, and the controller 190 may calculate the charging rate from the voltage between the terminals.

For example, the primary-side coil 11, the primary-side resonant coil 12, and the secondary-side resonant coil 110 may be made by winding cooper wires. However, materials for the primary-side coil 11, the primary-side resonant coil 12, and the secondary-side resonant coil 110 may be metal other than copper (e.g., gold, aluminum, etc.). Further, materials of the primary-side coil 11, the primary-side resonant coil 12, and the secondary-side resonant coil 110 may be different from one another.

In such a configuration, the primary-side coil 11 and the primary-side resonant coil 12 correspond to a power transmitting side, and the secondary-side resonant coil 110 corresponds to a power receiving side.

In a magnetic field resonance system, magnetic field resonance, generated between the primary-side resonant coil 12 and the secondary-side resonant coil 110, is utilized to transmit electric power from the power transmitting side to the power receiving side. Hence, it is possible to transmit the electric power over a longer distance than that of the electromagnetic induction system that utilizes electromagnetic induction to transmit electric power from the power transmitting side to the power receiving side. In other words, the secondary-side resonant coil 110 may utilize the magnetic field resonance or the electric field resonance, generated between the primary-side resonant coil 12 and the secondary-side resonant coil 110, to receive the electric power from primary-side resonant coil 12.

The magnetic field resonance system is more flexible than the electromagnetic induction system with respect to the position gap or the distance between the resonant coils. The magnetic field resonance system thus has an advantage called "free-positioning".

Figure 5:
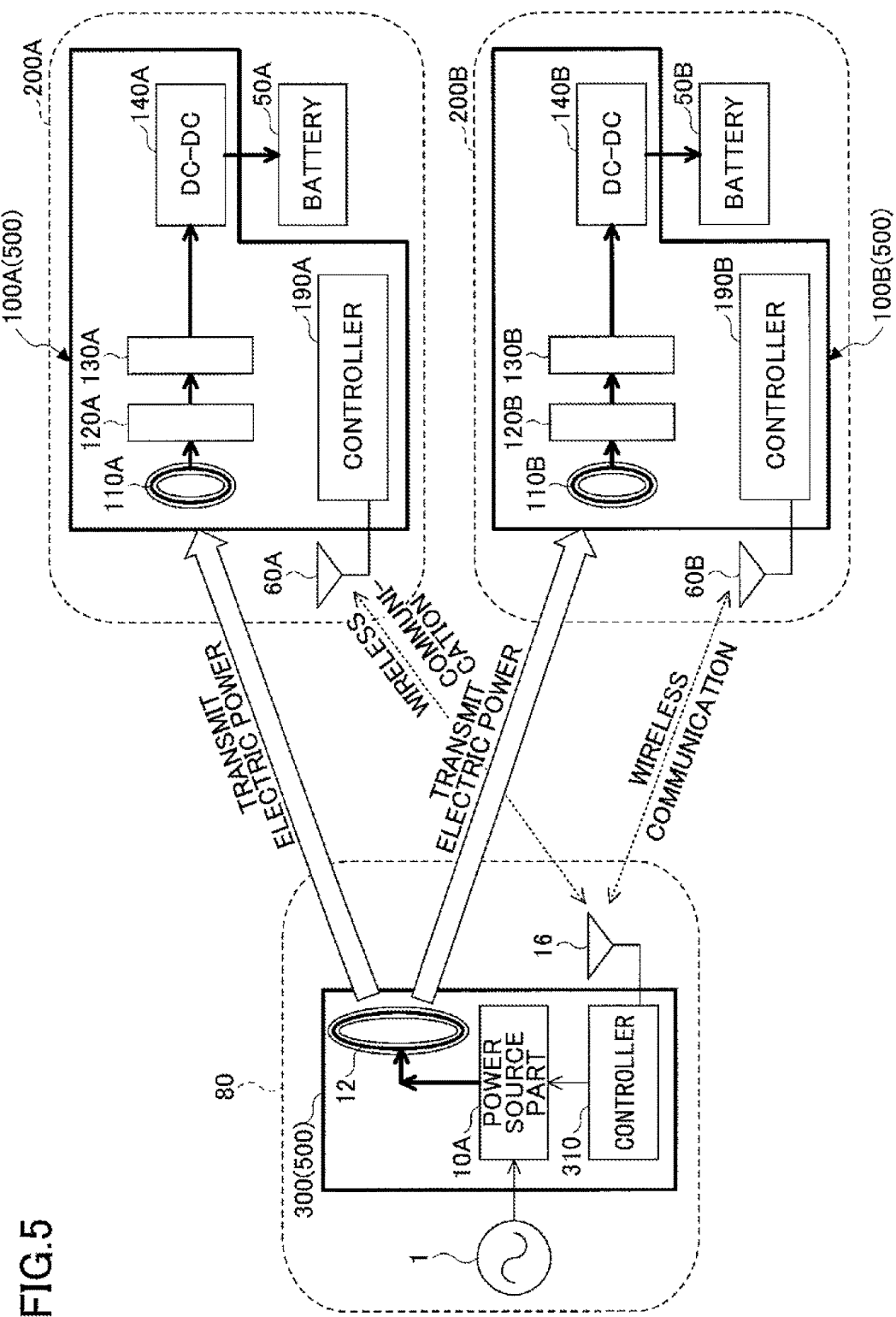
FIG. 5 is a diagram illustrating electronic devices 200A and 200B and a power transmitting apparatus 80 using a power transmitting system 500 according to the first embodiment.

FIG. 5 is a diagram illustrating electronic devices 200A and 200B and a power transmitting apparatus 80 using a power transmitting system 500 according to the first embodiment.

Although the power transmitting apparatus 80 in FIG. 5 has the same configuration as the power transmitting apparatus 80 illustrated in FIG. 4, configuration elements other than the primary-side coil 11 and the controller 310 in FIG. 4 are expressed as a power source part 10A. The power source part 10A expresses the primary-side resonant coil 12, the matching circuit 13, and the capacitor collectively. Here, the AC power source 1, the primary-side resonant coil 12, the matching circuit 13, and the capacitor 14 may be treated as the power source part collectively.

The power transmitting apparatus 80 further includes an antenna 16. For example, the antenna 16 may be any antenna that can perform wireless communication in a short distance (Near Field Communication) such as Bluetooth (registered trade mark). The antenna 16 is provided in order to receive, from the power receivers 100A and 100B included in the electronic devices 200A and 200B, data representing excess, deficiency, or the like of the received voltage or the like. The received data is input to the controller 310.

Each of the electronic devices 200A and 200B may be a terminal device such as a tablet computer or a smartphone, for example. The electronic devices 200A and 200B respectively include the power receivers 100A and 100B and the batteries 50A and 50B.

The power receivers 100A and 100B respectively have configurations where antennas 60A and 60B are added to the power receiver 100 illustrated in FIG. 4. Both of the DC-DC converters 140A and 140B are similar to the DC-DC converter 140 illustrated in FIG. 4 Further, both of the batteries 50A and 50B are similar to the battery 50 illustrated in FIG. 4.

The power receiver 100A includes a secondary-side resonant coil 110A, a rectifier circuit 120A, a smoothing capacitor 130A, a controller 190, and the antenna 60A. The secondary-side resonant coil 110A, the rectifier circuit 120A, the smoothing capacitor 130A, and the controller 190A respectively correspond to the secondary-side resonant coil 110, the rectifier circuit 120, the smoothing capacitor 130, and the controller 190 illustrated in FIG. 4. Here, FIG. 5 illustrates the secondary-side resonant coil 110A, the rectifier circuit 120A, and the smoothing capacitor 130A in a simplified manner. Further, the switches 151A, 151B, 152A, and 152B, the dummy load 160, the sub-battery 170, and the output terminals 180A and 180 are omitted in FIG. 5.

The power receiver 100B includes a secondary-side resonant coil 110B, a rectifier circuit 120BA, a smoothing capacitor 130B, a controller 190B, and the antenna 60B. The secondary-side resonant coil 110B, the rectifier circuit 120B, the smoothing capacitor 130B, and the controller 190B respectively correspond to the secondary-side resonant coil 110, the rectifier circuit 120, the smoothing capacitor 130, and the controller 190 illustrated in FIG. 4. Here, FIG. 5 illustrates the secondary-side resonant coil 110B, the rectifier circuit 120B, and the smoothing capacitor 130B in a simplified manner. Further, the switches 151A, 151B, 152A, and 152B, the dummy load 160, the sub-battery 170, and the output terminals 180A and 180 are omitted in FIG. 5.

For example, the antennas 60A and 60B may be any antenna that can perform wireless communication in a short distance (Near Field Communication) such as Bluetooth (registered trade mark). The antennas 60A and 60B are provided in order to perform data communication with the antenna 16 of the power transmitter 300. The antennas 60A and 60B are connected to the controllers 190A and 190B of the power receivers 100A and 100B, respectively. The controllers 190A and 190B are an example of a drive controller.

The controller 190A of the power receiver 100A transmits, to the power transmitter 300 via the antenna 60A, data representing excess, deficiency, or the like of the received voltage or the like. Similarly, the controller 190B of the power receiver 100B transmits, to the power transmitter 300 via the antenna 60B, data representing excess, deficiency, or the like of the received voltage or the like.

In a state where the electronic devices 200A and 200B are arranged adjacent to the power transmitting apparatus 80, the electronic devices 200A and 200B can respectively charge the batteries 50A and 50B without contacting the power transmitting apparatus 80. The batteries 50A and 50B can be charged at the same time.

The power transmitting system 500 is structured with the power transmitter 300 and the power receivers 100A and 100B of the configuration elements illustrated in FIG. 5. That is, the power transmitting apparatus 80 and the electronic devices 200A and 200B adopt the power transmitting system 500 that enables power transmission in a non-contact state by the magnetic field resonance. In other words, in the power transmitting system 500, the power transmitting apparatus 80 and the electronic devices 200A and 200B utilizes the magnetic field resonance to transmit and receive the electric power.

Figures 6, 7:
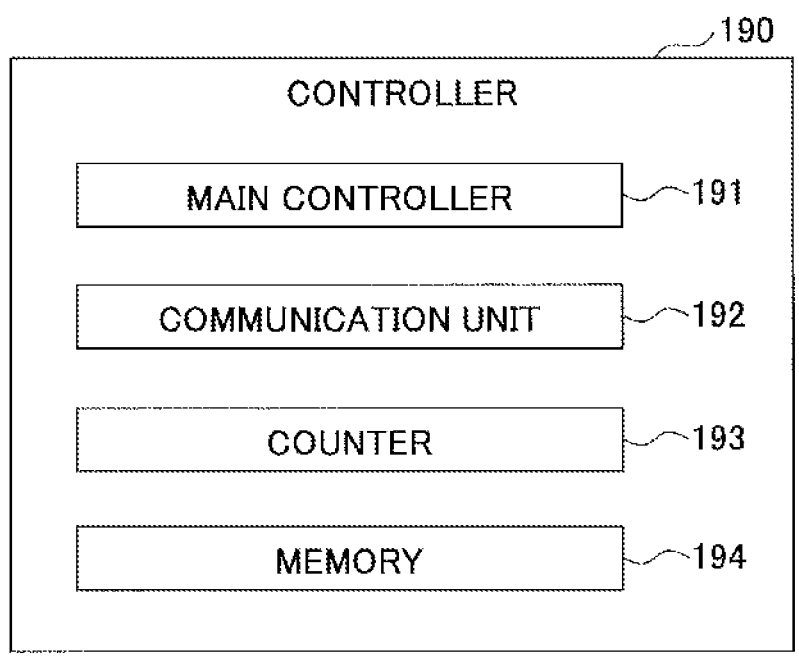
FIG. 6 is a diagram illustrating a configuration of a controller 190.
FIG. 7 is a diagram illustrating data stored in a memory 194.

FIG. 6 is a diagram illustrating a configuration of the controller 190. The controller 190 is included in the power receiver 100 illustrated in FIG. 4, and is similar to the controllers 190A and 190B illustrated in FIG. 5.

The controller 190 includes a main controller 191, a communication unit 192, a counter 193 and a memory 194.

The main controller 191 controls control processing of the controller 190. The main controller 191 performs the switching control of the above described switches 151A, 151B, 152A, and 152B. Further, the main controller 191 transmits electric power data and the charging rate data to the power transmitter 300 via the communication unit 192.

The charging rate data is input to the main controller 191 from the battery 50. The charging rate data represents a charging condition of the battery 50.

The electric power data represents that the received voltage of the power receiver 100 is excessive, is appropriate, or is lacking. The electric power data is generated by the main controller 191. Here, the appropriateness of the received voltage means that the received voltage is in a predetermined range considered appropriate. In other words, when the received voltage is in the predetermined range, the received voltage is appropriate.

It is determined depending on a relationship between an upper limit value of the received voltage and a lower limit value of the received voltage of the power receiver 100 whether the received voltage of the power receiver 100 is excessive, is appropriate, or is lacking. The upper limit value and the lower limit value of the received voltage are determined depending on a rated voltage of the power receiver 100. Because a value of current that the power receiver 100 supplies to the battery 50 is constant, an electric power value is calculated (obtained) by the received voltage and the current value.

Accordingly, the electric power data is data relating to the received voltage of the power receiver 100 (voltage that the power receiver 100 receives). Here, a relationship between the upper limit value and the lower limit value of the received voltage and the excess, the appropriateness, or the deficiency of the received voltage is described later.

Here, because the value of current that the power receiver 100 supplies to the battery 50 is constant, it can be considered that the received voltage is equivalent to electric power (received electric power) that the power receiver 100 receives from the power transmitter 300. Similarly, the rated voltage of the power receiver 100 is equivalent to a rated output (rated electric power) of the power receiver 100.

Thus, the upper limit value and the lower limit value of the received voltage of the power receiver 100 are equivalent to the upper limit value and the lower limit value of the received electric power of the power receiver 100. The upper limit value and the lower limit value of the received electric power are determined depending on the rated electric power of the power receiver 100.

Determining whether the received voltage of the power receiver 100 is excessive, is appropriate, or is lacking is equivalent to determining whether the received electric power of the power receiver 100 is excessive, is appropriate, or is lacking.

Thus, the data representing whether the received voltage of the power receiver 100 is excessive, is appropriate, or is lacking is referred to as the electric power data.

The communication unit 192 performs wireless communication with the power transmitter 300. For example, when the power receiver 100 performs Near Field Communication with the power transmitter 300 according to Bluetooth (registered trademark), the communication unit 192 is a modem for the Bluetooth. The communication unit 192 is an example of a power receiving side communication unit.

The counter 193 is used by the main controller 191 to count (determine) an elapsed time from the start of receiving the electric power. Increment and reset of the counter 193 are performed by the main controller 191.

The memory 194 stores data representing the rated voltage of the power receiver 100, the upper limit value of the received voltage, and the lower limit value of the received voltage. For example, the memory 194 may be a non-volatile memory.

Here, the rated output of the power receiver 100 is the rated output of the battery 50 that is a load device of the power receiver 100.

The upper limit value of the received voltage is an upper limit value of a voltage that can charge the battery 50 without generating surplus electric power that is not used to the charging when charging the battery 50, which is a load device of the power receiver 100. That is, if the received voltage of the power receiver 100 exceeds the upper limit value of the received voltage, excess electric power, which is not used to charge the battery 50, is generated when charging the battery 50.

The lower limit value of the received voltage is a minimum value of a voltage that can charge the battery 50, which is the load device of the power receiver 100. That is, if the received voltage of the power receiver 100 becomes less than the lower limit value of the received voltage, it becomes impossible to charge the battery 50.

FIG. 7 is a diagram illustrating data stored in the memory 194.

As illustrated in FIG. 7, the data representing the rated output of the power receiver 100, the upper limit value of the received voltage, and the lower limit value of the received voltage are stored in the memory 194. FIG. 7 illustrates, as an example, the upper limit value and the lower limit value of the received voltage in a case where the rated voltage of the power receiver 100 is 5 V. The upper limit value of the received voltage is 6 V and the lower limit value of the received voltage is 5 V.

Using the upper limit value and the lower limit value of the received voltage as illustrated in FIG. 7, the main controller 191 may determine that the received voltage is lacking when the received voltage is less than 5 V, for example. That is, the main controller 191 may determine that the received voltage is lacking in a case of "the received voltage <5 V".

Further, when the received voltage is equal to or greater than 5 V and equal to or less than 6 V, the main controller 191 may determine that the received voltage is appropriate. That is, the main controller 191 may determine that the received voltage is appropriate in a case of "5 V the received voltage 6 V".

Further, when the received voltage is higher than 6 V, the main controller 191 may determine that the received voltage is excessive. That is, the main controller 191 may determine that the received voltage is excessive in a case of "6 V<the received voltage".

Further, in a case where the rated voltage is 10 V, the upper limit value of the received voltage is 12 V, and the lower limit value of the received voltage is 10 V, for example, the main controller 191 may make a determination as follows.

The main controller 191 may determine that the received voltage is lacking when the received voltage is less than 10 V, for example. That is, the main controller 191 may determine that the received voltage is lacking in a case of "the received voltage <10 V".

Further, when the received voltage is equal to or greater than 10 V and equal to or less than 12 V, the main controller 191 may determine that the received voltage is appropriate. That is, the main controller 191 may determine that the received voltage is appropriate in a case of "10 V the received voltage 12 V".

Further, when the received voltage is higher than 12 V, the main controller 191 may determine that the received voltage is excessive. That is, the main controller 191 may determine that the received voltage is excessive in a case of "12 V<the received voltage".

In a case where the main controller 191 determines that the received voltage is lacking, the main controller 191 transmits, to the power transmitter 300, data representing that the received voltage is lacking. Also, in a case where the main controller 191 determines that the received voltage is appropriate, the main controller 191 transmits, to the power transmitter 300, data representing that the received voltage is appropriate. Further, in a case where the main controller 191 determines that the received voltage is excessive, the main controller 191 transmits, to the power transmitter 300, data representing that the received voltage is excessive.

Figures 8, 9:
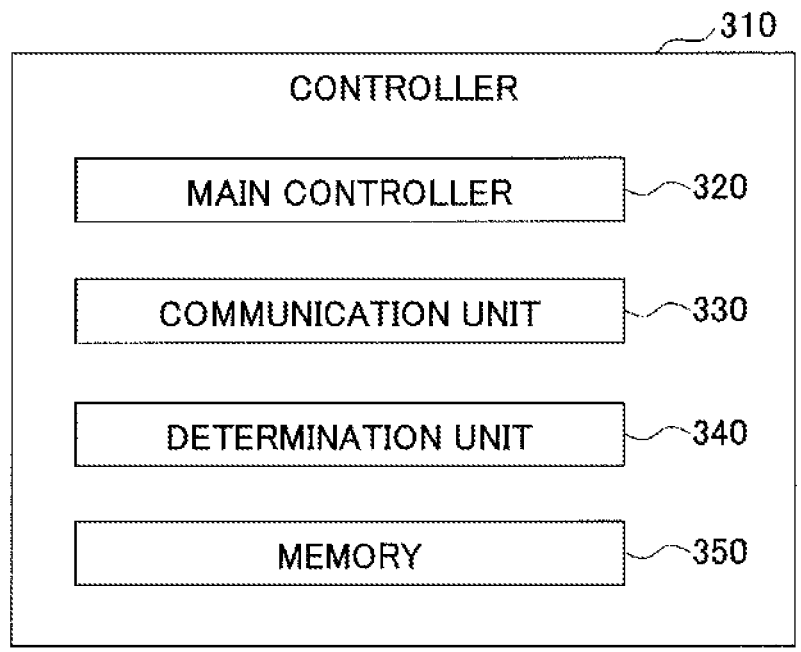
FIG. 8 is a diagram illustrating a data structure of electric power data.
FIG. 9 is a diagram illustrating a configuration of a controller 310.

FIG. 8 is a diagram illustrating a data structure of the electric power data.

The electric power data generated by the main controller 191 is stored in the memory 194 in association with an ID (Identification) of the power receiver 100. FIG. 8 illustrates, as an example, the data where the ID of the power receiver 100 is 001, and the electric power data represents that the received voltage is excessive.

The electric power data represents whether the received voltage of the power receiver 100 is excessive, is appropriate, or is lacking. For example, the electric power data can be represented by a 2-bit data value. For example, the data value representing that the excess may be set to be "10", the data value representing the appropriateness may be set to be "01", and the data value representing the deficiency may be set to be "00".

FIG. 9 is a diagram illustrating a configuration of the controller 310. The controller 310 is included in the power transmitter 300 illustrated in FIGS. 4 and 5.

Herein, an example of a case will be described where the power transmitter 300 (see FIG. 5) communicates with two or more power receivers 100 to control the received voltage.

The controller 310 includes a main controller 320, a communication unit 330, a determination unit 340, and a memory 350.

The main controller 320 controls control processing of the controller 310.

The communication unit 330 performs wireless communication with each power receiver 100. For example, when the power transmitter 300 performs Near Field Communication with the power receiver 100 according to Bluetooth (registered trademark), the communication unit 330 is a modem for the Bluetooth.

The communication unit 330 receives the electric power data from each power receiver 100. The electric power data received from each power receiver 100 represents that the received voltage of the power receiver 100 is excessive, is appropriate, or is lacking.

The determination unit 340 determines, based on the electric power data received from each power receiver 100, whether a power receiver 100 whose received voltage is excessive, a power receiver 100 whose received voltage is lacking, and a power receiver 100 whose received voltage is in an appropriate range are present. Also, the determination unit 340 determines, based on the electric power data received from each power receiver 100, whether both the power receiver 100 whose received voltage is excessive and the power receiver 100 whose received voltage is lacking are present. In other words, the determination unit 340 can determine whether a voltage received by a power receiver 100 is excessive, is appropriate, or is lacking for each power receiver 100.

The memory 350 stores data representing predetermined electric power of when the power transmitter 300 decreases transmission electric power (electric power that the power transmitter 300 transmits) and predetermined electric power of when the power transmitter 300 increases transmission electric power (electric power that the power transmitter 300 transmits). The predetermined electric power of when decreasing the transmission electric power may be different from the predetermined electric power of when increasing the transmission electric power.

Figure 10:
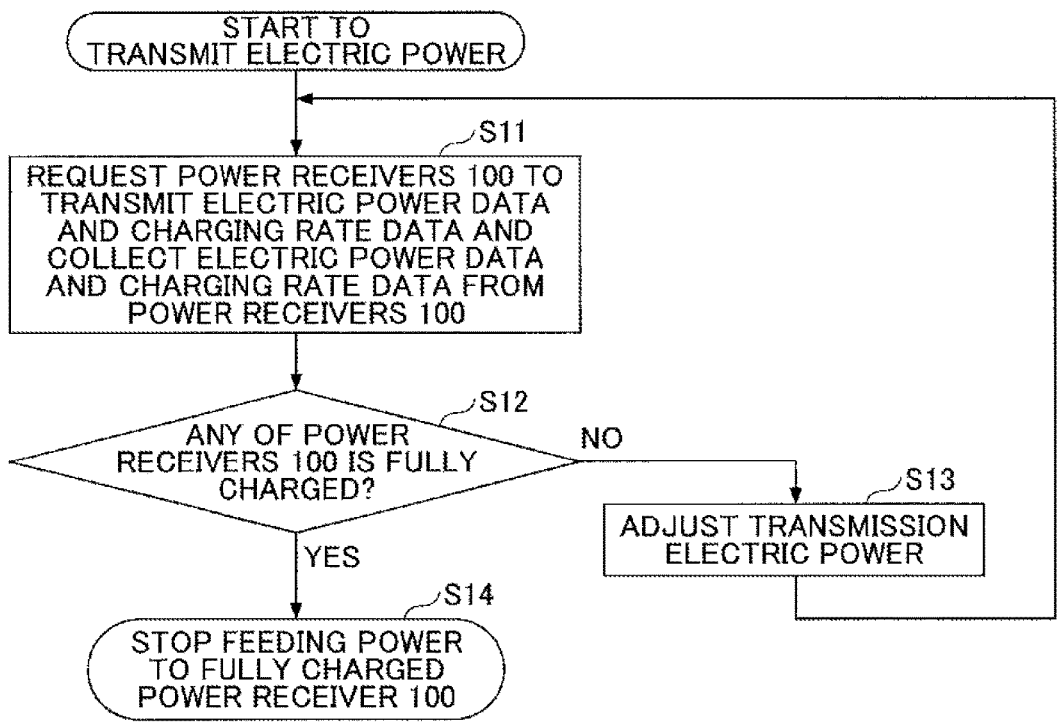
FIG. 10 is a flowchart illustrating processing that a power transmitter 300 of the power transmitting system 500 according to the first embodiment executes.

FIG. 10 is a flowchart illustrating processing that the power transmitter 300 of the power transmitting system 500 according to the first embodiment executes.

Here, a case will be described where, when a plurality of power receivers 100 receive the electric power transmitted from the power transmitter 300 at the same time, the power transmitter 300 optimizes the transmission electric power. Here, processing is similarly performed in a case where the power transmitter 300 transmits the electric power to one power receiver 100.

The power transmitter 300 starts to transmit the electric power (START TO TRANSMIT ELECTRIC POWER). The electric power is output from the primary-side resonant coil 12 of the power transmitter 300. Here, electric power of a preset (predetermined) initial output may be output from the primary-side resonant coil 12 immediately after the start of transmitting the electric power.

At step S11, the power transmitter 300 requests each power receiver 100 to transmit the electric power data and the charging rate data, and collects (receives) the electric power data and the charging rate data from each power receiver 100.

At step S12, the power transmitter 300 determines whether any of the power receivers 100 is fully charged based on the charging rate data received from each power receiver 100. This is because it is not necessary to transmit the electric power when the power receiver 100 is fully charged.

When the power transmitter 300 has determined that none of the power receivers 100 is fully charged (NO at step S12), the power transmitter 300 adjusts the electric power to be transmitted (transmission electric power) from the primary-side resonant coil 12 at step S13.

In a case where one or more power receivers 100 of which received voltage is excessive are present and the received voltage of the leftover receiver 100 is appropriate, the power transmitter 300 decreases the transmission electric power by the predetermined electric power at step S13.

In a case where one or more power receivers 100 of which received voltage is lacking are present and the received voltage of the leftover power receiver 100 is appropriate, the power transmitter 300 increases the transmission electric power by the predetermined electric power at step S13.

At step S13, when it is determined by the determination unit 340 that a plurality of power receivers 100 of which received voltage is appropriate are present, the power transmitter 300 maintains the transmission electric power. That is, the power transmitter 300 maintains the transmission electric power of that time without changing the transmission electric power.

"The power transmitter 300 maintains the transmission electric power of that time without changing the transmission electric power" correspond to "degree of adjustment of the transmission electric power is zero".

The data, representing the predetermined electric power of when the power transmitter 300 decreases the transmission electric power and the predetermined electric power of when the power transmitter 300 increases the transmission electric power, is stored in the memory 350 in advance.

When the processing of step S13 is finished, the power transmitter 300 returns the flow to step S11.

In a case where the determination unit 340 has determined that any of the power receivers 100 is fully charged (YES at step S12), the power receiver 300 stops feeding the power to the fully charged power receiver 100 at step S14.

For example, the power transmitter 300 causes the power receiver 100 to stop receiving the electric power by transmitting, to the power receiver 100, an instruction that disables the DC-DC converter 140.

Here, as for one or more power receivers 100 that are not fully charged, the processing illustrated in FIG. 10 is continuously performed to charge the power receivers 100 that are not fully charged.

The power receivers 100 can be charged by repeatedly performing the above described processing.

Each power receiver 100 constantly detects power reception status during receiving the electric power from the power transmitter 300. Each power receiver 100 regularly transmits the electric power data and the charging rate data to the power transmitter 300 in response to the request (step S11) from the power transmitter 300. When the received voltage of one of the plurality of power receivers 100 being charged becomes zero, or when disruption of the communication occurs, the power transmitter 300 may determine that the power receiver 100 is away from a chargeable area and stop to transmit the electric power. After that, the processing illustrated in FIG. 10 is continuously performed to charge the other power receivers 100.

Figure 11:
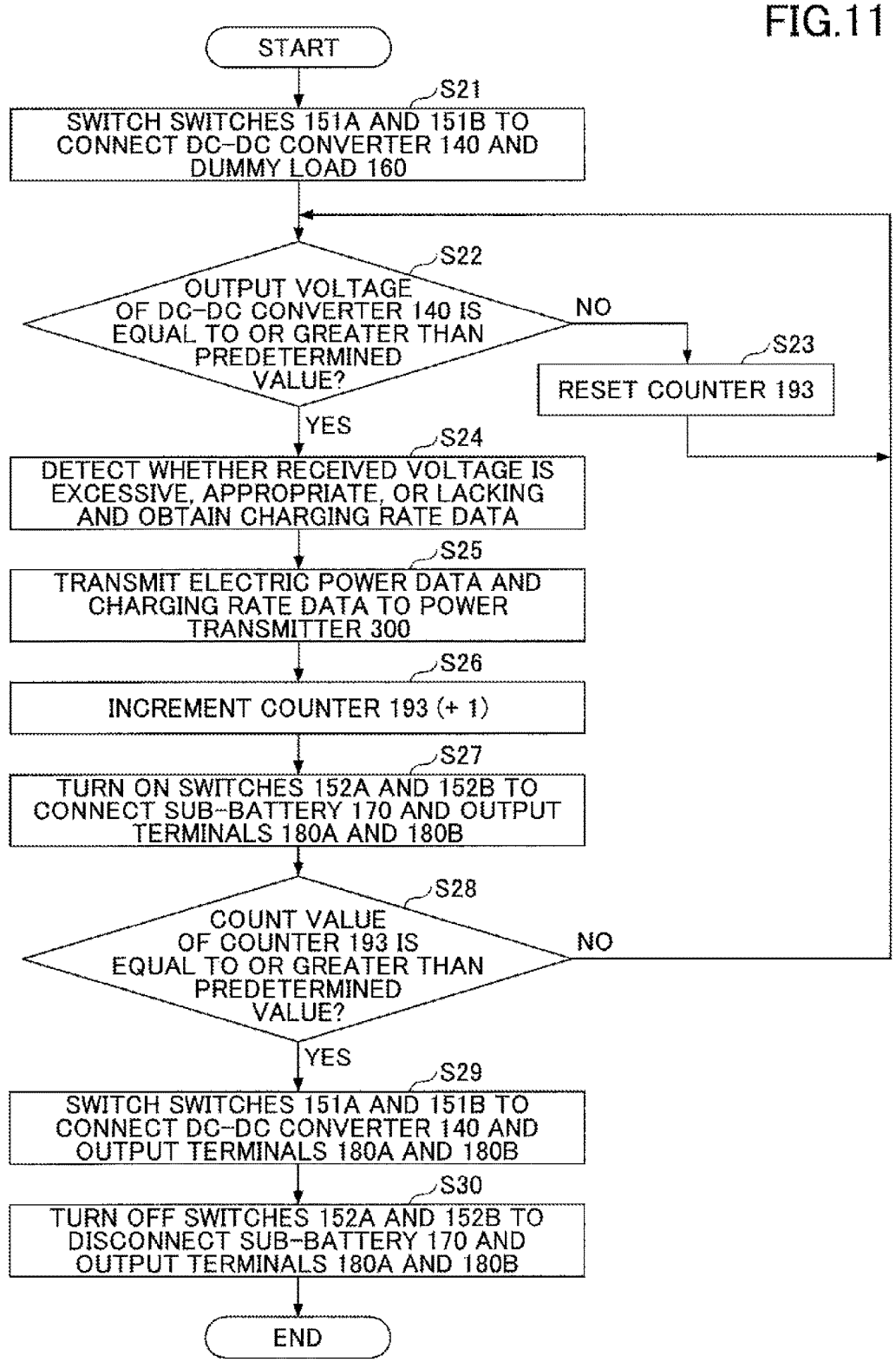
FIG. 11 is a flowchart illustrating processing that the controller 190 of the power receiver 100 executes.

FIG. 11 is a flowchart illustrating processing that the controller 190 of the power receiver 100 executes.

The controller 190 starts the flow when electric power receiving is started (START). It is determined based on the voltage value detected by the voltmeter 125 whether the electric power receiving is started. In a case where the voltage value of the output side of the rectifier circuit 120 detected by the voltmeter 125 becomes equal to or greater than a predetermined voltage from a 0 V state, the controller 190 determines that the electric power receiving is started.

The controller 190 switches the switches 151A and 151B so as to connect the DC-DC converter 140 and the dummy load 160 at step S21.

The controller 190 determines whether the output voltage of the DC-DC converter 140 is equal to or greater than the predetermined value at step S22. The output voltage of the DC-DC converter 140 can be detected by the voltmeter 145.

The predetermined value used in the determination of step S22 may be set to an output voltage (rated value) of the DC-DC converter 140 of when the DC-DC converter 140 operates. Here, the predetermined value used in the determination of step S22 may be set to a value obtained by subtracting a value of margin or error from the output voltage (rated value) of the DC-DC converter 140.

It is determined at step S22 whether the output voltage of the DC-DC converter 140 is equal to or greater than the predetermined value in order to determine whether the DC-DC converter 140 starts the operation.

When the controller 190 has determined that the output voltage of the DC-DC converter 140 is not equal to or greater than the predetermined value (NO at step S22), the controller 190 resets the counter 193 at step S23. A state where the output voltage of the DC-DC converter 140 is less than the predetermined value is a state where the DC-DC converter 140 is not started up.

When the output voltage of the DC-DC converter 140 is not equal to or greater than the predetermined value (NO at step S22), the counter 193 is reset at step S23 so as to count an elapsed time from when the power receiver 100 starts to receive the electric power.

The controller 190 compares the received voltage with the upper limit value and the lower limit value (see FIG. 7) to detect whether the received voltage of the power receiver 100 is excessive, is appropriate, or is lacking and obtains the charging rate data from the battery 50 at step S24. The charging rate data is transmitted to the controller 190 from the battery 50 by the controller 190 requesting the battery 50 to transmit the charging rate data.

At step S25, the controller 190 generates the electric power data representing a result detected at step S24 to transmit, to the power transmitter 300 via the communication unit 192, the generated electric power data and the charging rate data obtained at step S24.

Here, the processing of step S25 is performed by the controller 190 in response to the request from the power transmitter 300 at step S11 illustrated in FIG. 10. In this way, the power transmitter 300 collects the electric power data and the charging rate data.

The controller 190 increments the counter 193 at step S26. In this way, a count value of the counter 193 is incremented by one.

The controller 190 turns on (closes) the switches 152A and 152B so as to connect the sub-battery 170 and the output terminals 180A and 180B at step S27. This is to make the battery 50 be in a chargeable state, by connecting the sub-battery 170 to the battery 50 to start to charge the battery 50 and by applying the voltage between the terminals 51A and 51B until a required time, required for the battery 50 to enter the chargeable state, has passed, before the DC-DC converter 140 is connected to the battery 50 later.

Because of the following reasons, the processing (step S27) for connecting the sub-battery 170 to the battery 50 is performed after the processing (step S21) for connecting the dummy load 160 to the DC-DC converter 140.

The DC-DC converter 140 stops the operation in order to ensure the safety when a state where the current cannot be supplied to the load or the like connected to the output side occurs. On the other hand, a certain time is necessary for the battery 50 to be in the chargeable state.

Under such conditions, the processing (step S21) for connecting the dummy load 160 to the DC-DC converter 140 is performed first in order to maintain the operating state of the DC-DC converter 140 until the battery 50 becomes chargeable in a state where the electric power transmission from the power transmitter 300 to the power receiver 100 is started.

Here, if the DC-DC converter 140 can be maintained in the operating state, the processing (step S21) for connecting the dummy load 160 to the DC-DC converter 140 and the processing (step S27) for connecting the sub-battery 170 to the battery 50 may be performed at the same time.

Here, loop processing structured by steps S22 to S28 is repeatedly executed until it is determined (YES at step S28) that the count value of the counter 193 is equal to or greater than the predetermined value at step S28, which will be described later.

Thus, at step S27 in the second or succeeding round of the loop processing of steps S22 to S28, the switches 152A and 152B are maintained in the on-state (closed state) and the flow proceeds to step S28 because the switches 152A and 152B have been turned on (closed) already at step S27 in the first round of the loop processing.

The controller 190 determines whether the count value of the counter 193 is equal to or greater than the predetermined value at step S28.

The predetermined value of step S28 may be set to be a value such that a time, required from when the switches 152A and 152B are switched at step S27 in the first round of the loop processing of steps S22 to S28 until the processing proceeds to step S28 in a round in which the count value reaches the predetermined value after the loop processing is repeatedly executed for the number of times represented by the predetermined value of step S28, is longer than the required time until the battery 50 becomes chargeable from the start of charging the battery 50. In other words, the flow may proceed to step S29 after the time, required for the battery 50 to enter the chargeable state, has passed.

When the controller 190 has determined that the count value of the counter 193 is equal to or greater than the predetermined value (YES at step S28), the controller 190 switches the switches 151A and 151B so as to connect the DC-DC converter 140 and the output terminals 180A and 180B at step S29. In this way, the battery 50 is connected to the DC-DC converter 140.

Next, the controller 190 turns off (opens) the switches 152A and 152B so as to disconnect the sub-battery 170 and the output terminals 180A and 180B at step S30. In this way, the sub-battery 170 is disconnected from the battery 50.

When both the state where the DC-DC converter 140 stably outputs the electric power having the desired voltage value and the state where the battery 50 is chargeable are realized by repeatedly executing the loop processing structured by steps S22 to S28, the flow proceeds to step S29. Thus, at step S29, the switches 151A and 151B are switched to charge the battery 50 using the electric power output from the DC-DC converter 140.

Further, because the battery 50 is charged with the electric power output from the DC-DC converter 140 at the time point when the flow proceeds to step S29 and it becomes unnecessary to connect the sub-battery 170 to the battery 50, the sub-battery 170 is disconnected from the battery 50 at step S30.

Because of the following reasons, the processing (step S29) for connecting the battery 50 to the DC-DC converter 140 is performed before the processing (step S30) for disconnecting the sub-battery 170 from the battery 50.

The DC-DC converter 140 stops the operation in order to ensure the safety when the state where the current cannot be supplied to the load or the like connected to the output side occurs. Thus, it is preferable in terms of stably charging the battery 50 to switch the switches 151A, 151B, 152A, and 152B in the following order. That is, the switches 151A, 151B, 152A, and 152B are switched to connect the battery 50, which is caused to be in the chargeable state in advance, to the DC-DC converter 140 and then the sub-battery 170 is disconnected from the battery 50.

Here, if the DC-DC converter 140 can be maintained in the operating state and the battery 50 can be maintained in the chargeable state, the processing (step S29) for connecting the battery 50 to the DC-DC converter 140 and the processing (step S30) for disconnecting the sub-battery 170 from the battery 50 may be performed at the same time.

When step S30 is finished, the battery 50 is stably charged with the output electric power of the DC-DC converter 140. Then, a series of processing is finished (END).

As described above, according to the first embodiment, when the power receiver 100 starts to receive the electric power from the power transmitter 300, the switches 151A, 151B, 152A, and 152B are switched to connect the DC-DC converter 140 to the dummy load 160 and to connect the sub-battery 170 to the battery 50. Specifically, while controlling the switches 151A and 151B so as to respectively connect the output terminals 141A and 141B to the terminals 161A and 161B of the dummy load 160, the controller 190 controls the switches 152A and 152B so as to respectively connect the output terminals 171A and 171B to the output terminals 180A and 180B. In this way, the state where the DC-DC converter 140 operates stably is maintained and the battery 50 is caused to be in the stably chargeable state.

Then, when the battery 50 enters (becomes) the stably chargeable state, the switches 151A, 151B, 152A, and 152B are switched to switch the connection destination of the DC-DC converter 140 from the dummy load 160 to the battery 50 and to disconnect the sub-battery 170 from the battery 50. In other words, after a predetermined time for starting up the battery 50 has passed after the secondary-side resonant coil 110 starts to receive the electric power from the primary-side resonant coil 12, while controlling the switches 151A and 151B so as to respectively connect the output terminals 141A and 141B to the output terminals 180A and 180B and so as to respectively disconnect the output terminals 141A and 141B from the terminals 161A and 161B, the controller 190 controls the switches 152A and 152B so as to respectively disconnect the output terminals 171A and 171B from the output terminals 180A and 180B.

Accordingly, when the power receiver 100 starts to receive the electric power from the power transmitter 300, it becomes possible to prevent the DC-DC converter 140 from stopping the operation and to start to charge the battery 50 stably.

As described above, according to the first embodiment, it becomes possible to provide the power receiver 100 that can charge the battery 50 stably.

Here, in the above described descriptions, the embodiment has been described where the power receiver 100 includes the switches 151A, 151B, 152A, and 152B. However, the power receiver 100 does not have to include the switches 151B and 152B in a case where the low potential side line is held at ground potential.

Further, although the embodiment has been described where the controller 190 includes the counter 193 to count the predetermined value corresponding to the required time until the battery 50 becomes chargeable from the start of charging the battery 50, a modified power receiver 101 may be used as illustrated in FIG. 11.

Figure 12:
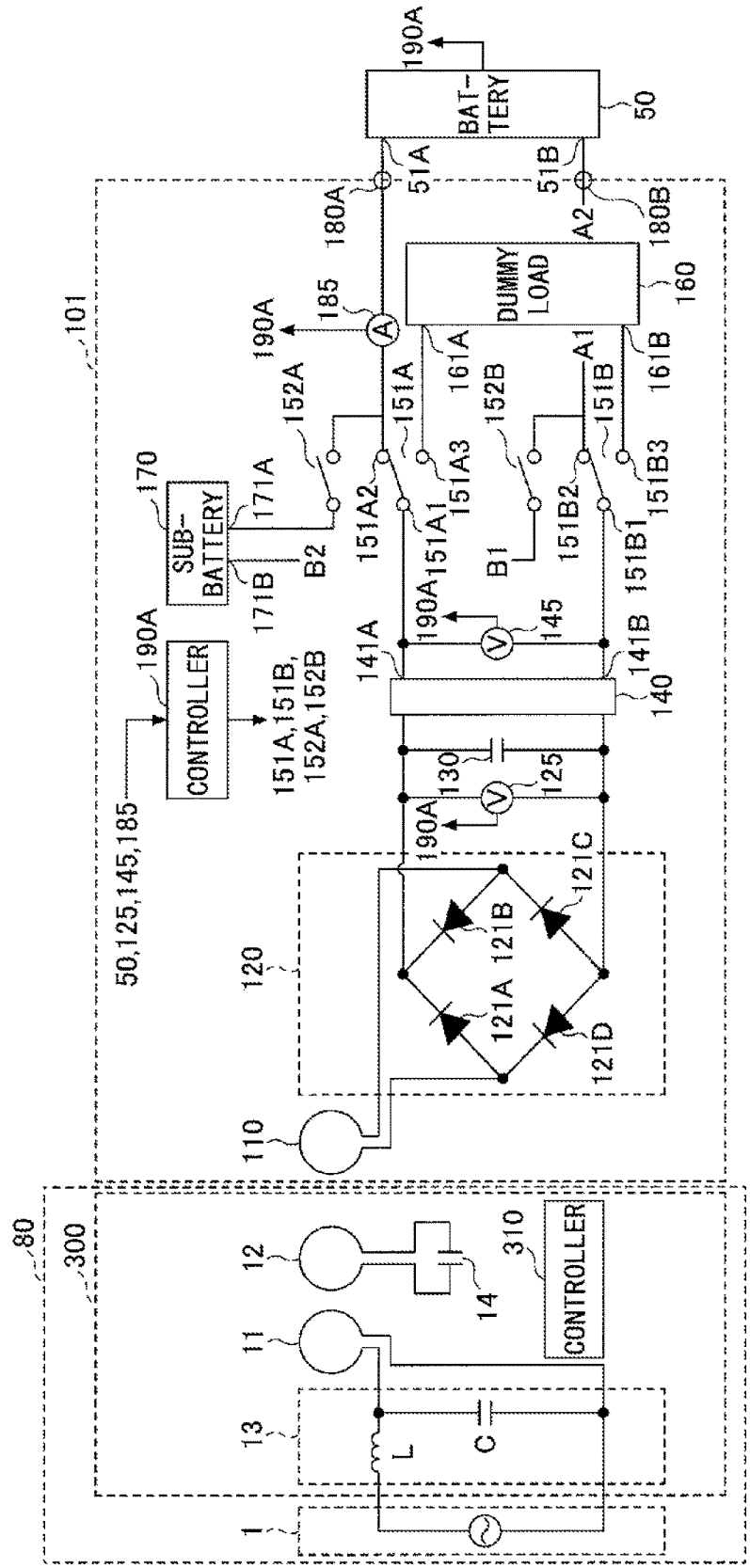
FIG. 12 is a diagram illustrating the power transmitter 300 and a power receiver 101 according to a first variation example of the first embodiment.

FIG. 12 is a diagram illustrating the power transmitter 300 and the power receiver 101 according to a first variation example of the first embodiment. The power receiver 101 includes the secondary-side resonant coil 110, the rectifier circuit 120, the voltmeter 125, the smoothing capacitor 130, the DC-DC converter 140, the voltmeter 145, the switches 151A, 151B, 152A, and 152B, the dummy load 160, the sub-battery 170, the output terminals 180A and 180B, an ammeter 185, and a controller 190A.

The power receiver 101 illustrated in FIG. 12 has a configuration where the ammeter 185 is added to the power receiver 100 illustrated in FIG. 4. Also the power receiver 101 includes the controller 190A instead of the controller 190 of FIG. 4. The controller 190A of FIG. 12 differs from the controller 190 of FIG. 4 in that the controller 190A does not include the counter 193 (see FIG. 6) and the controller 190A determines whether the battery is in the chargeable state based on a current value detected by the ammeter 185 instead of the count value.

The ammeter 185 is inserted in series to the high potential side line between the switch 151A and the output terminal 180A. Here, it is preferable to use an ammeter that can detect a weak current as far as possible as the ammeter 185. This is to suppress current consumption in the ammeter 185 as much as possible. For example, the ammeter 185 may be actualized by a sense resistor.

The ammeter 185 detects a current value that flows from the ammeter 185 to the battery 50 and outputs, to the controller 190A, data representing the current value.

Figure 13:
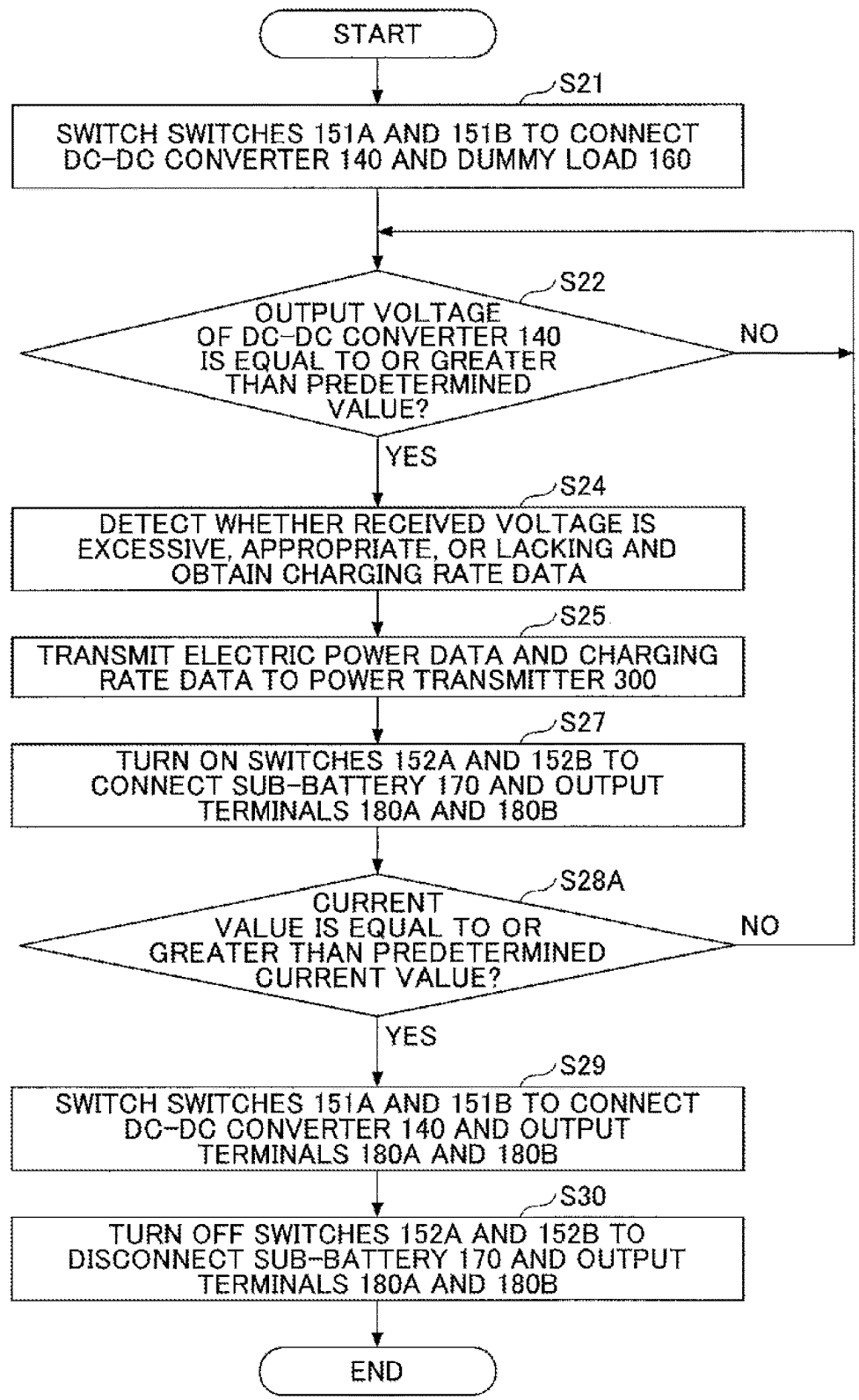
FIG. 13 is a flowchart illustrating processing that a controller 190A of the power receiver 101 executes.

FIG. 13 is a flowchart illustrating processing that the controller 190A of the power receiver 101 executes.

The processing executed by the controller 190A differs from the processing (see FIGS. 4 and 6) executed by the controller 190 in that determination is made based on the current value detected by the ammeter 185 instead of the count value of the counter 193 (see FIG. 6).

Accordingly, the flowchart illustrated in FIG. 13 does not have steps S23 and S26 of the flow illustrated in FIG. 11. However, the processing at steps S21, S22, S24, S25, S27, S29, and S30 is similar to the processing at the respective corresponding steps of the flowchart illustrated in FIG. 11. Further, the processing at step S28 of the flow illustrated in FIG. 11 is changed to processing at step S28A, which is determination processing based on the current value. In the following, the differences are mainly described.

At step S28A, the controller 190A determines whether a current value detected by the ammeter 185 is equal to or greater than a predetermined current value.

The predetermined current value at step S28A may be set to a minimum current value of when the battery 50 enters the chargeable state.

A state, where the determination at step S28A is "NO" and loop processing from step S22 to step S28A is repeatedly executed, is a state where the current that flows from the sub-battery 170 to the battery 50 does not reach the predetermined current value. In other words, when the current does not reach the predetermined current value (NO at step S28A), the loop forming processing is repeatedly executed.

Accordingly in a case where the controller 190A has determined that the current value detected by the ammeter 185 is equal to or greater than the predetermined current value (YES at step S28A), the flow proceeds to step S29. Then the switches 151A and 151B are switched to connect the DC-DC converter 140, which operates stably, and the battery 50, which has entered the chargeable state.

As described above, according to the first variation example of the first embodiment, when the power receiver 101 starts to receive the electric power from the power transmitter 300, the battery 50 can be charged stably by switching the switches 151A, 151B, 152A, and 152B based on the current value detected by the ammeter 185.

In this way, according to the first variation example of the first embodiment, it becomes possible to provide the power receiver 101 that can charge the battery 50 stably.

Figure 14:
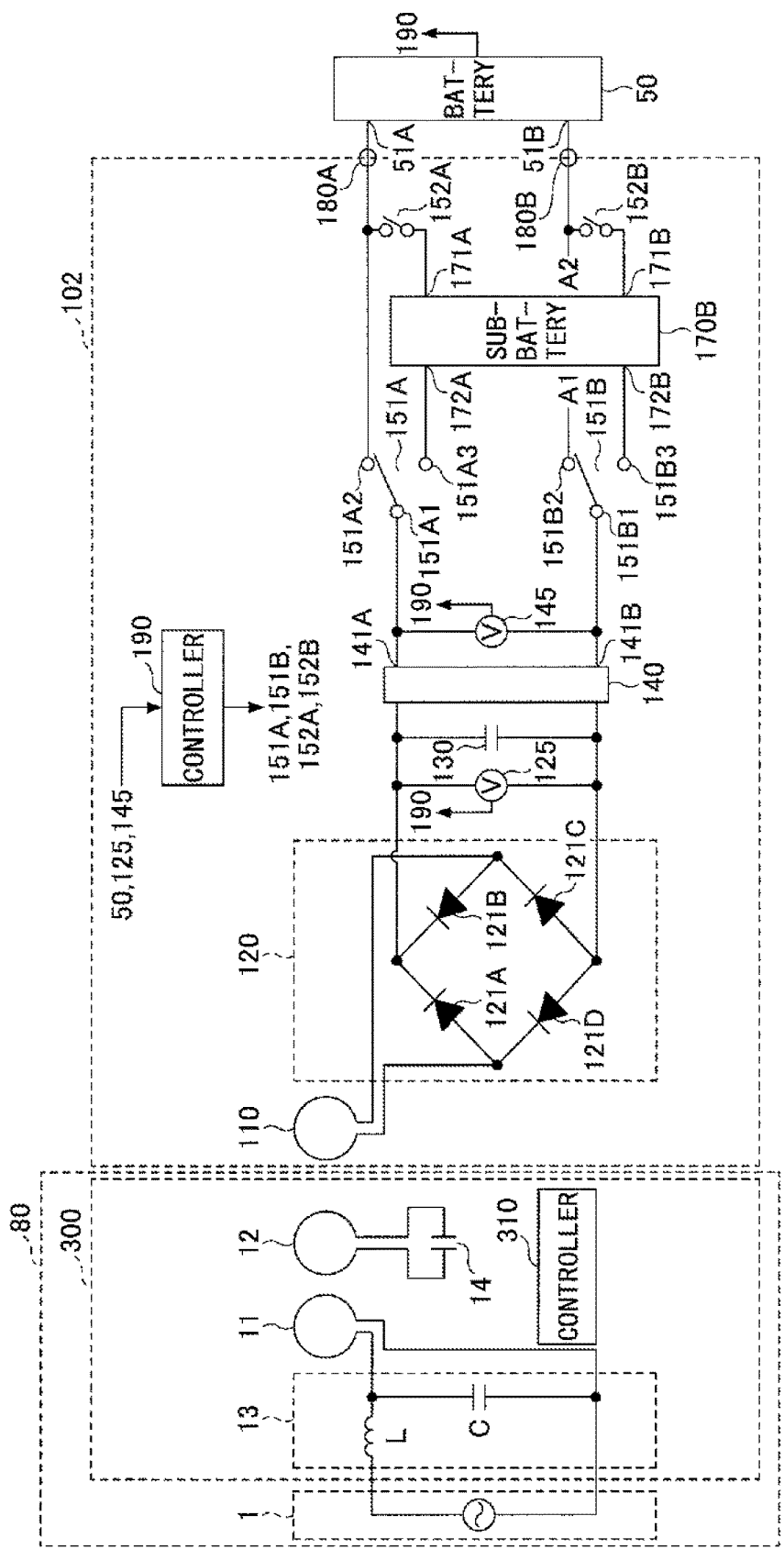
FIG. 14 is a diagram illustrating the power transmitting apparatus 80 and a power receiver 102 according to a second variation example of the first embodiment.

Further, a power receiver 102 illustrated in FIG. 14 may be used instead of the power receiver 100 illustrated in FIG. 4.

FIG. 14 is a diagram illustrating the power transmitting apparatus 80 and the power receiver 102 according to a second variation example of the first embodiment. The power transmitting apparatus 80 illustrated in FIG. 14 is similar to the power transmitting apparatus 80 illustrated in FIG. 4. As for the power receiver 102 illustrated in FIG. 14, same reference numbers are given to elements similar to the elements of the power receiver 100 illustrated in FIG. 4 and overlapping descriptions may be omitted as appropriate.

The power receiver 102 includes the secondary-side resonant coil 110, the rectifier circuit 120, the voltmeter 125, the smoothing capacitor 130, the DC-DC converter 140, the voltmeter 145, the switches 151A, 151B, 152A, and 152B, a sub-battery 170B, the output terminals 180A and 180B, and the controller 190.

The power receiver 102 of FIG. 14 differs from the power receiver 100 (see FIG. 4) in that the power receiver 102 does not include the dummy load 160 (see FIG. 4) but does include the sub-battery 170B instead of the sub-battery 170 (see FIG. 4). Differing from the battery 50, the sub-battery 170B is a battery that can perform charging immediately after the voltage is applied and the current is supplied so as to start the charging from a non-charging state.

The sub-battery 170B differs from the sub-battery 170 (see FIG. 4) in that the sub-battery 170B includes input terminals 172A and 172B in addition to output terminals 171A and 171B. The input terminals 172A and 172B are an example of power input terminals (first and second power input terminals) of a sub-secondary battery.

Further, a connection relation of the switches 151A and 151B of the power receiver 102 differs from the connection relation of the switches 151A and 151B of the power receiver 100 (see FIG. 4) as follows.

The terminal 151A3 of the switch 151A is connected to the high potential side input terminal 172A of the sub-battery 170B. Thus, the switch 151A switches the connection destination of the high potential side output terminal 141A of the DC-DC converter 140 to either the output terminal 180A or the high potential side input terminal 172A of the sub-battery 170B. In other words, the switch 151A selectively connects the output terminal 141A to the output terminal 180A or the input terminal 172A.

The terminal 151B3 of the switch 151B is connected to the low potential side input terminal 172B of the sub-battery 170B. Thus, the switch 151B switches the connection destination of the low potential side output terminal 141B of the DC-DC converter 140 to either the output terminal 180B or the low potential side input terminal 172B of the sub-battery 170B. In other words, the switch 151B selectively connects the output terminal 141B to the output terminal 180B or the input terminal 172A.

Further, when the controller 190 performs switching control of the switches 151A, 151B, 152A, and 152B, connection (connection status) between the DC-DC converter 140, the sub-battery 170B, and the battery 50 is switched as follows.

When the power receiver 102 starts to receive the electric power from the power transmitter 300, the controller 190 switches the switches 151A and 151B so as to respectively connect the output terminals 141A and 141B of the DC-DC converter 140 and the input terminals 172A and 172B of the sub-battery 170B.

Further, when the power receiver 102 starts to receive the electric power from the power transmitter 300, the controller 190 turns on (closes) the switches 152A and 152B so as to respectively connect the output terminals 171A and 171B of the sub-battery 170B and the output terminals 180A and 180B.

In this state, the DC-DC converter 140 is maintained in the operating state by supplying the current to the sub-battery 170B. Further, at this time, the sub-battery 170B is charged by the DC-DC converter 140.

When a predetermined time has passed after the power receiver 102 starts to receive the electric power from the power transmitter 300, the controller 190 turns off (opens) the switches 152A and 152B so as to respectively disconnect the output terminals 171A and 171B of the sub-battery 170B and the output terminals 180A and 180B. Further, when the predetermined time has passed after the power receiver 102 starts to receive the electric power from the power transmitter 300, the controller 190 switches the switches 151A and 151B so as to respectively connect the output terminals 141A and 141B of DC-DC converter 140 and the output terminals 180A and 180B.

As described above, according to the second variation example of the first embodiment, similar to the first embodiment, it becomes possible to connect the DC-DC converter 140, maintained in the operating state, and the battery 50, maintained in the chargeable state.

Thus, according to the second variation example of the first embodiment, it becomes possible to provide the power receiver 102 that can charge the battery 50 stably.

Figure 15:
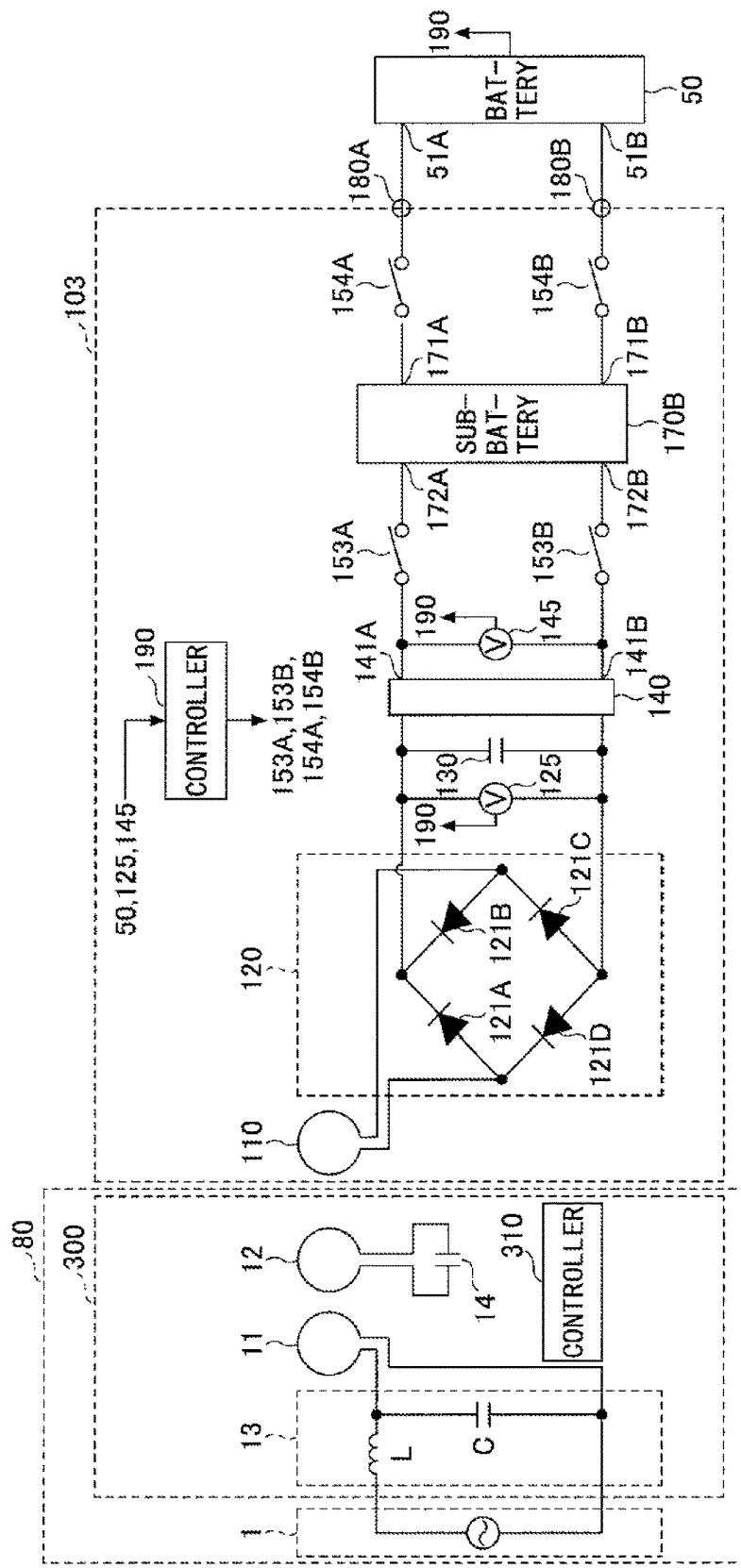
FIG. 15 is a diagram illustrating the power transmitting apparatus 80 and a power receiver 103 according to a third variation example of the first embodiment.

FIG. 15 is a diagram illustrating the power transmitting apparatus 80 and a power receiver 103 according to a third variation example of the first embodiment. The power transmitting apparatus 80 illustrated in FIG. 15 is similar to that of the power transmitting apparatus 80 illustrated in FIG. 4. As for the power receiver 103 illustrated in FIG. 15, same reference numbers are given to elements similar to the elements of the power receiver 102 illustrated in FIG. 14 and overlapping descriptions may be omitted as appropriate.

The power receiver 103 includes the secondary-side resonant coil 110, the rectifier circuit 120, the voltmeter 125, the smoothing capacitor 130, the DC-DC converter 140, the voltmeter 145, switches 153A, 153B, 154A, and 154B, the sub-battery 170B, the output terminals 180A and 180B, and the controller 190.

The power receiver 103 differs from the power receiver 100 (see FIG. 4) in that the switches 153A, 153B, 154A, and 154B are used to connect the DC-DC converter 140, the sub-battery 170B, and the output terminals 180A and 180B instead of the switches 151A, 151B, 152A, and 152B (see FIG. 14). For example, the switches 153A, 153B, 154A, and 154B may be realized by Field Effect Transistors (FET).

Similar to the switches 152A and 152B illustrated in FIG. 14, the switch 153A is a two-terminal switch. The switch 153A is inserted in series to the high potential side line between the output terminal 141A of the DC-DC converter 140 and the input terminal 172A of the sub-battery 170B.

Similar to the switches 152A and 152B illustrated in FIG. 14, the switch 153B is a two-terminal switch. The switch 153B is inserted in series to the low potential side line between the output terminal 141B of the DC-DC converter 140 and the input terminal 172B of the sub-battery 170B.

Similar to the switches 152A and 152B illustrated in FIG. 14, the switch 154A is a two-terminal switch. The switch 154A is inserted in series to the high potential side line between the output terminal 171A of the sub-battery 170B and the output terminal 180A.

Similar to the switches 152A and 152B illustrated in FIG. 14, the switch 154B is a two-terminal switch. The switch 154B is inserted in series to the low potential side line between the output terminal 171B of the sub-battery 170B and the output terminal 180B.

When the power receiver 103 starts to receive the electric power from the power transmitter 300, the controller 190 turns on (closes) the switches 153A and 153B so as to respectively connect the output terminals 141A and 141B of the DC-DC converter 140 and the input terminals 172A and 172B of the sub-battery 170B.

Further, when the power receiver 103 starts to receive the electric power from the power transmitter 300, the controller 190 turns on (closes) the switches 154A and 154B so as to connect the output terminals 171A and 171B of the sub-battery 170B and the output terminals 180A and 180B, respectively.

In this state, the DC-DC converter 140 is maintained in the operating state by supplying the current to the sub-battery 170B. Further, at this time, the sub-battery 170B is charged by the DC-DC converter 140.

Further, in this state, the charging of the battery 50 from the sub-battery 170B is started.

Then, when the predetermined time has passed, after the switches 153A, 153B, 154A, and 154B are turned on (closed) to start to receive the electric power, and the battery 50 becomes receivable (chargeable), the electric power is supplied to the battery 50 from the DC-DC converter 140 via the sub-battery 170B. In this way, the battery 50 is charged by the DC-DC converter 140.

As described above, according to the third variation example of the first embodiment, similar to the first embodiment, the first variation example of the first embodiment, and the second variation example of the first embodiment, it becomes possible to connect the DC-DC converter 140, maintained in the operating state, and the battery 50, maintained in the chargeable state.

Thus, according to the third variation example of the first embodiment, it becomes possible to provide the power receiver 103 that can charge the battery 50 stably.

Second Embodiment

Figure 16:
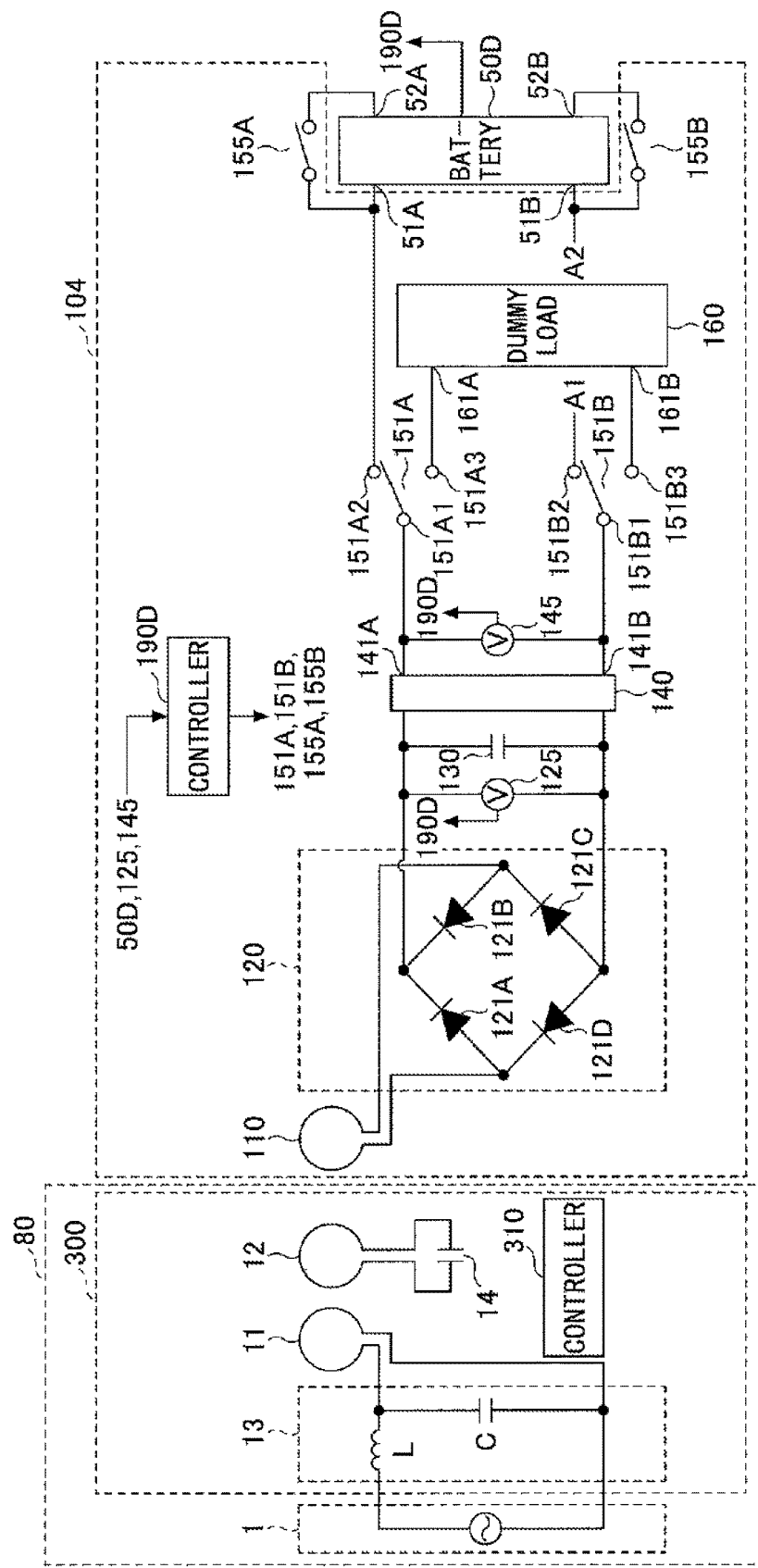
FIG. 16 is a diagram illustrating the power transmitter 300 and a power receiver 104 according to a second embodiment.

FIG. 16 is a diagram illustrating the power transmitter 300 and a power receiver 104 according to a second embodiment.

The power receiver 104 includes the secondary-side resonant coil 110, the rectifier circuit 120, the voltmeter 125, the smoothing capacitor 130, the DC-DC converter 140, the voltmeter 145, switches 151A, 151B, 155A, and 155B, the dummy load 160, the output terminals 180A and 180B, and a controller 190D.

The power receiver 104 of FIG. 16 differs from the power receiver 100 of FIG. 4 in that the power receiver 104 includes the controller 190D instead of the controller 190 illustrated in FIG. 4, includes the switches 155A and 155B instead of the switches 152A and 152B illustrated in FIG. 4, and does not include the sub-battery 170.

Further, the battery 50D connected to the output terminals 180A and 180B of the power receiver 104 differs from the battery 50 illustrated in FIG. 4 in that the battery 50D has terminals 52A and 52B in addition to the terminals 51A and 51B. Here, the terminals 51A and 51B are an example of first and second power input terminals, and the terminals 52A and 52B are an example of fifth and sixth power output terminals. In the following, the differences are mainly described.

The switch 155A is inserted in series between the terminal 51A and the terminal 52A of the battery 50D. The switch 155B is inserted in series between the terminal 51B and the terminal 52B of the battery 50D. The switches 155A and 155B are an example of a second switching unit. For example, the switches 155A and 155B may be realized by the Field Effect Transistors (FET).

The terminals 52A and 52B are dedicated terminals that output the electric power from the battery 50D. The terminals 51A and 51B are used as terminals that charge the battery 50D with the electric power supplied from the DC-DC converter 140. However, after the charging is completed, the terminals 51A and 51B can be used as output terminals that output the electric power necessary to drive the electric device 200A or 200B (see FIG. 5) including the power receiver 104.

The controller 190D performs switching control of the switches 151A, 151B, 155A, and 155B to perform control for preparing an environment where the battery 50D can be stably charged.

When the power receiver 104 starts to receive the electric power from the power transmitter 300, the controller 190D switches the switches 151A and 151B so as to connect the DC-DC converter 140 and the dummy load 160 and turns on (closes) the switches 155A and 155B so as to respectively connect the terminals 51A and 51B and the terminals 52A and 52B of the battery 50.

At this time, the DC-DC converter 140 supplies the electric power to the dummy load 160 and is maintained in the operating state. Also, at this time, the battery 50D inputs, from the terminals 51A and 51B, the voltage output from the terminals 52A and 52B. Thereby, the voltage between the terminals of the battery 50D stabilizes gradually toward the chargeable state of the battery 50D.

Further, when the predetermined time has passed after the power receiver 104 starts to receive the electric power from the power transmitter 300, the controller 190D switches the switch 151A and 151B so as to connect the DC-DC converter 140 and the output terminals 180A and 180B and turns off (opens) the switches 155A and 155B.

In this way, the DC-DC converter 140 and the battery 50D are connected. Also, the terminals 51A and 51B and the terminals 52A and 52B are disconnected respectively.

Figure 17:
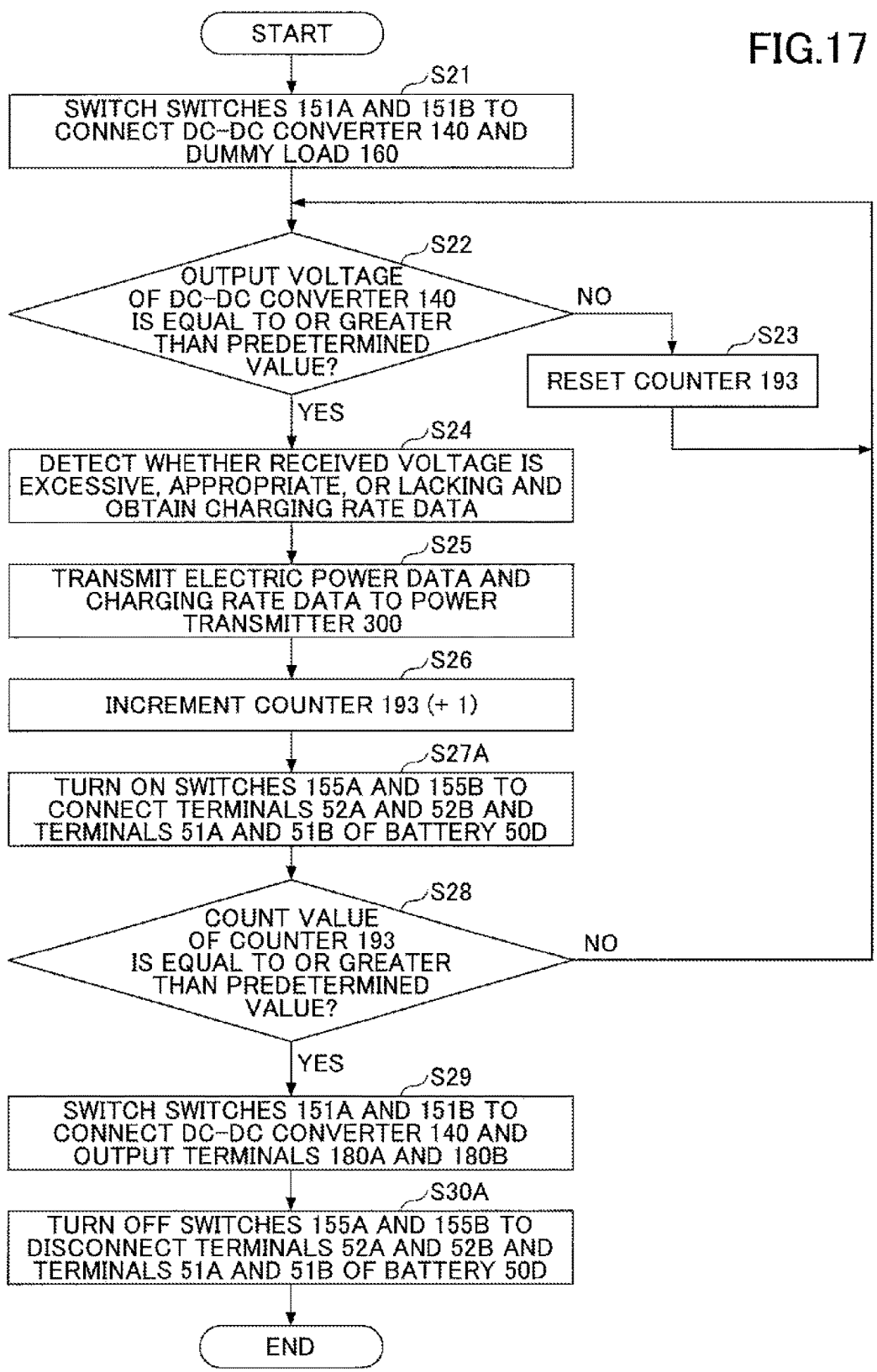
FIG. 17 is a flowchart illustrating processing that a controller 190D of the power receiver 104 executes.

FIG. 17 is a flowchart illustrating processing that the controller 190D of the power receiver 104 executes.

In the processing executed by the controller 190D, switches switched at steps S27A and S30A differ from the switches switched by the controller 190 (see FIGS. 4 and 6) of the first embodiment at steps S27 and S30 of the flowchart illustrated in FIG. 11.

Other steps of FIG. 17 are similar to steps of the flowchart illustrated in FIG. 11. In the following, the differences are mainly described.

When the processing of step S26 is finished, the controller 190D turns on (closes) the switches 155A and 155B so as to respectively connect the terminals 51A and 51B and the terminals 52A and 52B of the battery 50D at step S27A. This is to make the battery 50D be in the chargeable state, by connecting the terminals 51A and 51B and the terminals 52A and 52B of the battery 50D to start to charge the battery 50D and by applying the voltage between the terminals 51A and 51B until a required time, required for the battery 50 to enter the chargeable state, has passed, before the DC-DC converter 140 is connected to the battery 50D later.

When the processing of step S27A is finished, the controller 190D causes the flow to proceed to step S28.

When the processing of step S29 is finished, the controller 190D turns off (opens) the switches 155A and 155B so as to respectively disconnect the terminals 51A and 51B and the terminals 52A and 52B of the battery 50D at step S30A.

As described above, according to the second embodiment, when the power receiver 104 starts to receive the electric power from the power transmitter 300, the voltage output from the terminals 52A and 52B of the battery 50D is input to the terminals 51A and 51B so as to stabilize the voltage between the terminals of the battery 50D.

Then, when the battery 50D enters the chargeable state, the switches 151A and 151B are switched so as to respectively connect the output terminals 141A and 141B of the DC-DC converter 140 to the terminals 51A and 51B of the battery 50D. Further, at this time, the switches 155A and 155B are turned off (opened) so as to respectively disconnect the terminals 51A and 51B and the terminals 52A and 52B of the battery 50D.

According to such switching control of the switches 151A, 151B, 155A, and 155B, it becomes possible to connect the DC-DC converter 140, which is maintained in the operating state, and the battery 50D, which is maintained in the chargeable state, and to charge the battery 50D stably.

As described above, according to the second embodiment, it becomes possible to provide the power receiver 104 that can charge the battery 50D stably.

Although examples of a power receiver according to the embodiments of the present invention have been described, the present invention is not limited to the embodiments specifically disclosed and various variations and modifications may be made without departing from the scope of the present invention.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the sprit and scope of the invention.

What is claimed is:

1. A power receiver comprising:
   a secondary-side resonant coil configured to utilize magnetic field resonance or electric field resonance, generated between a primary-side resonant coil and the secondary-side resonant coil, to receive electric power from the primary-side resonant coil;
   a rectifier circuit connected to the secondary-side resonant coil and configured to rectify alternating-current power input from the secondary-side resonant coil;
   a smoothing circuit connected to an output side of the rectifier circuit;
   a DC-DC converter connected to an output side of the smoothing circuit and having first and second output terminals;
   third and fourth output terminals disposed on an output side of the DC-DC converter and connected to a secondary battery;
   a sub-secondary battery having fifth and sixth output terminals respectively connectable to the third and fourth output terminals and configured to output direct-current power to the secondary battery;
   a switch disposed between the first and second output terminals and the third and fourth output terminals and configured to switch connection between the first and second output terminals, the third and fourth output terminals, and the fifth and sixth output terminals; and
   a controller configured, when the secondary-side resonant coil starts to receive the electric power from the primary-side resonant coil, to control the switch so as to respectively connect the first and second output terminals and a load or first and second input terminals of the sub-secondary battery and so as to respectively connect the third and fourth output terminals and the fifth and sixth output terminals,
   wherein, after a predetermined time for starting up the secondary battery has passed after the secondary-side resonant coil starts to receive the electric power from the primary-side resonant coil, the controller controls the switch so as to respectively connect the third and fourth output terminals and the first and second output terminals and so as to respectively disconnect the first and second output terminals and the load or the first and second input terminals of the sub-secondary battery and controls the switch so as to respectively disconnect the third and fourth output terminals and the fifth and sixth output terminals.

2. The power receiver according to claim 1, further comprising the load.

3. The power receiver according to claim 1,
wherein the switch includes
a first switching unit disposed between the first and second output terminals, the third and fourth output terminals, and the load and configured to respectively switch connection destinations of the first and second output terminals to either the third and fourth output terminals or the load; and
a second switching unit configured to switch connection status between the third and fourth output terminals and the fifth and sixth output terminals,
wherein, when the secondary-side resonant coil starts to receive the electric power from the primary-side resonant coil, the controller controls the first switching unit so as to respectively connect the first and second output terminals and the load and controls the second switching unit so as to respectively connect the third and fourth output terminals and the fifth and sixth output terminals, and
wherein, after the predetermined time for starting up the secondary battery has passed after the secondary-side resonant coil starts to receive the electric power from the primary-side resonant coil, the controller controls the first switching unit so as to respectively connect the first and second output terminals and the third and fourth output terminals and controls the second switching unit so as to respectively disconnect the third and fourth output terminals and the fifth and sixth output terminals.

4. The power receiver according to claim 1,
wherein the switch includes
a first switching unit disposed between the first and second output terminals, the third and fourth output terminals, and the first and second input terminals of the sub-secondary battery and configured to respectively switch connection destinations of the first and second output terminals to either the third and fourth output terminals or the first and second input terminals of the sub-secondary battery; and
a second switching unit configured to switch connection status between the third and fourth output terminals and the fifth and sixth output terminals,
wherein, when the secondary-side resonant coil starts to receive the electric power from the primary-side resonant coil, the controller controls the first switching unit so as to respectively connect the first and second output terminals and the first and second input terminals of the sub-secondary battery and controls the second switching unit so as to respectively connect the third and fourth output terminals and the fifth and sixth output terminals, and
wherein, after the predetermined time for starting up the secondary battery has passed after the secondary-side resonant coil starts to receive the electric power from the primary-side resonant coil, the controller controls the first switching unit so as to respectively connect the first and second output terminals and the third and fourth output terminals and controls the second switching unit so as to respectively disconnect the third and fourth output terminals and the fifth and sixth output terminals.

5. A power receiver comprising:
a secondary-side resonant coil configured to utilize magnetic field resonance or electric field resonance generated between a primary-side resonant coil and the secondary-side resonant coil to receive electric power from the primary-side resonant coil;
a rectifier circuit connected to the secondary-side resonant coil and configured to rectify alternating-current power input from the secondary-side resonant coil;
a smoothing circuit connected to an output side of the rectifier circuit;
a DC-DC converter connected to an output side of the smoothing circuit and having first and second output terminal;
third and fourth output terminals disposed on an output side of the DC-DC converter and respectively connected to first and second power input terminals of a secondary battery, the secondary battery including the first and second power input terminals and fifth and sixth power output terminals;
a load;
a first switch disposed between the first and second output terminals, the third and fourth output terminals, and the load and configured to respectively switch connection destinations of the first and second output terminals to either the third and fourth output terminals or the load;
a second switch configured to switch connection status between the first and second power input terminals and the fifth and sixth power output terminals; and
a controller configured to control the first switch and the second switch,
wherein, when the secondary-side resonant coil starts to receive the electric power from the primary-side resonant coil, the controller controls the first switch so as to respectively connect the first and second output terminals of the DC-DC converter and the load and controls the second switch so as to respectively connect the first and second power input terminals and the fifth and sixth power output terminals, and
wherein, after a predetermined time for starting up the secondary battery has passed after the secondary-side resonant coil starts to receive the electric power from the primary-side resonant coil, the controller controls the first switch so as to respectively connect the first and second output terminals of the DC-DC converter and the third and fourth output terminals and controls the second switch so as to respectively disconnect the first and second power input terminals and the fifth and sixth power output terminals.

* * * * *